US010311558B2

(12) United States Patent
Su et al.

(10) Patent No.: US 10,311,558 B2
(45) Date of Patent: Jun. 4, 2019

(54) EFFICIENT IMAGE PROCESSING ON CONTENT-ADAPTIVE PQ SIGNAL DOMAIN

(71) Applicant: Dolby Laboratories Licensing Corporation, San Francisco, CA (US)

(72) Inventors: Guan-Ming Su, Fremont, CA (US); Amin Kheradmand, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 3 days.

(21) Appl. No.: 15/344,785

(22) Filed: Nov. 7, 2016

(65) Prior Publication Data
US 2017/0140513 A1    May 18, 2017

Related U.S. Application Data

(60) Provisional application No. 62/255,703, filed on Nov. 16, 2015.

(30) Foreign Application Priority Data

Dec. 15, 2015 (EP) .................................. 15200054

(51) Int. Cl.
*G06T 5/00* (2006.01)
*G06T 5/50* (2006.01)
(Continued)

(52) U.S. Cl.
CPC ................ *G06T 5/40* (2013.01); *G06T 5/007* (2013.01); *G06T 5/50* (2013.01); *G06T 11/60* (2013.01);
(Continued)

(58) Field of Classification Search
CPC ........... G06T 11/60; G06T 2207/20208; G06T 2207/20221; G06T 5/007; G06T 5/50;
(Continued)

(56) References Cited

U.S. PATENT DOCUMENTS 9,497,456 B2 * 11/2016 Su .......................... H04N 19/30
9,584,811 B2 *  2/2017 Su ......................... H04N 19/176
(Continued)

FOREIGN PATENT DOCUMENTS

| WO | 2016/049327 | 3/2016 |
|---|---|---|
| WO | 2016/140954 | 9/2016 |
| WO | 2016/153896 | 9/2016 |

OTHER PUBLICATIONS

Pu, F. et al "Comments on Reshaping for HPB/WCG Compression" MPEG Meeting Motion Picture Expert Group or ISO/IEC/JTC 1/SC29/WG11, Oct. 21, 2015.
(Continued)

*Primary Examiner* — Shaghayegh Azima

(57) ABSTRACT

An image processing device receives one or more forward reshaped images that are generated by an image forward reshaping device from one or more wide dynamic range images based on a forward reshaping function. The forward reshaping function relates to a backward reshaping function. The image processing device performs one or more image transform operations on the one or more forward reshaped images to generate one or more processed forward reshaped images without performing backward reshaping operations on the one or more reshaped images or the one or more processed forward reshaped images based on the backward reshaping function. The one or more processed forward reshaped images are sent to a second image processing device.

10 Claims, 21 Drawing Sheets

(51) Int. Cl.
G06T 5/40 (2006.01)
G06T 11/60 (2006.01)
H04N 5/357 (2011.01)

(52) U.S. Cl.
CPC ... *H04N 5/357* (2013.01); *G06T 2207/10024* (2013.01); *G06T 2207/20208* (2013.01); *G06T 2207/20221* (2013.01)

(58) Field of Classification Search
CPC ... G06T 5/40; G06T 2207/10024; G09G 5/00; H04N 5/357
See application file for complete search history.

(56) References Cited

U.S. PATENT DOCUMENTS

| | | | | |
|---|---|---|---|---|
| 2005/0244071 | A1* | 11/2005 | Zaharia | G06T 9/007 382/251 |
| 2011/0249143 | A1 | 10/2011 | Tatsumi | |
| 2015/0078661 | A1* | 3/2015 | Granados | G06T 5/009 382/167 |
| 2016/0014420 | A1 | 1/2016 | Su | |
| 2016/0134872 | A1* | 5/2016 | Su | H04N 19/176 375/240.03 |
| 2017/0111643 | A1* | 4/2017 | Bugdayci Sansli | H04N 19/30 |
| 2017/0140513 | A1* | 5/2017 | Su | G06T 5/007 |

OTHER PUBLICATIONS

SMPTE Standard "High Dynamic Range Electro-Optical Transfer Function of Mastering Reference Displays" SMPTE St 2084:2014, Aug. 16, 2014, pp. 1-14.

SMPTE, SMPTE Monthly Webcast: Title "A Perceptual EOTF for Extended Dynamic Range Imagery" May 6, 2014.

Poynton C et al "Deploying Wide Colour Gamut and High Dynamic Range in HD and UHD" Sep. 11-15, 2014.

ITU-R BT.1886 "Reference Electro-Optical Transfer Function for Flat Panel Displays Used in HDTV Studio Production" Mar. 2011, pp. 1-7.

Stessen, J. et al "Chromaticity Based Color Signals for Wide Color Gamut and High Dynamic Range" ISO/IEC JTC1/SC29/WG11 MPEG 2014, Oct. 2014.

* cited by examiner

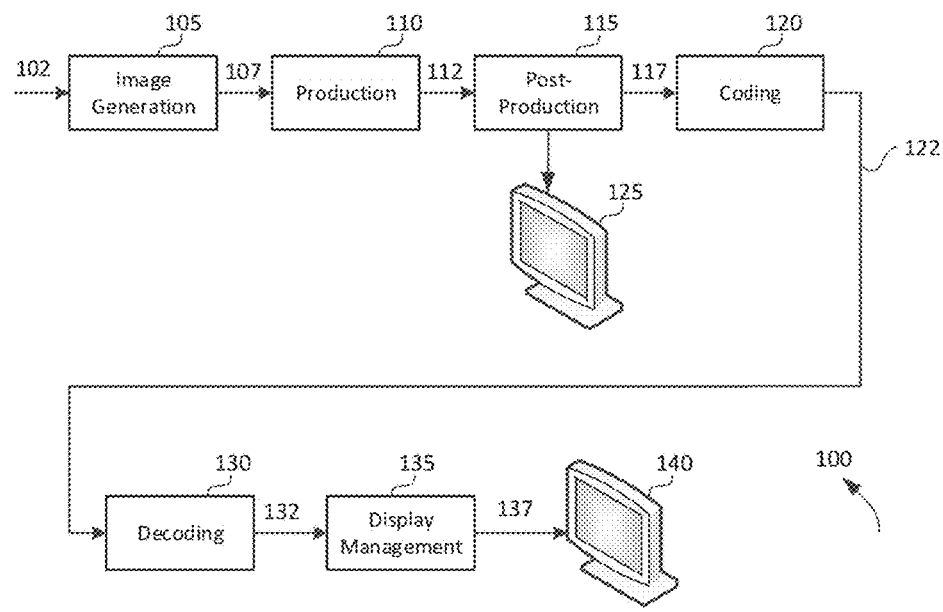
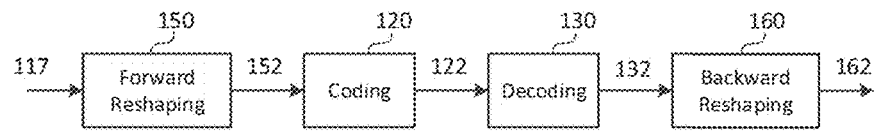
FIG. 1A
FIG. 1B

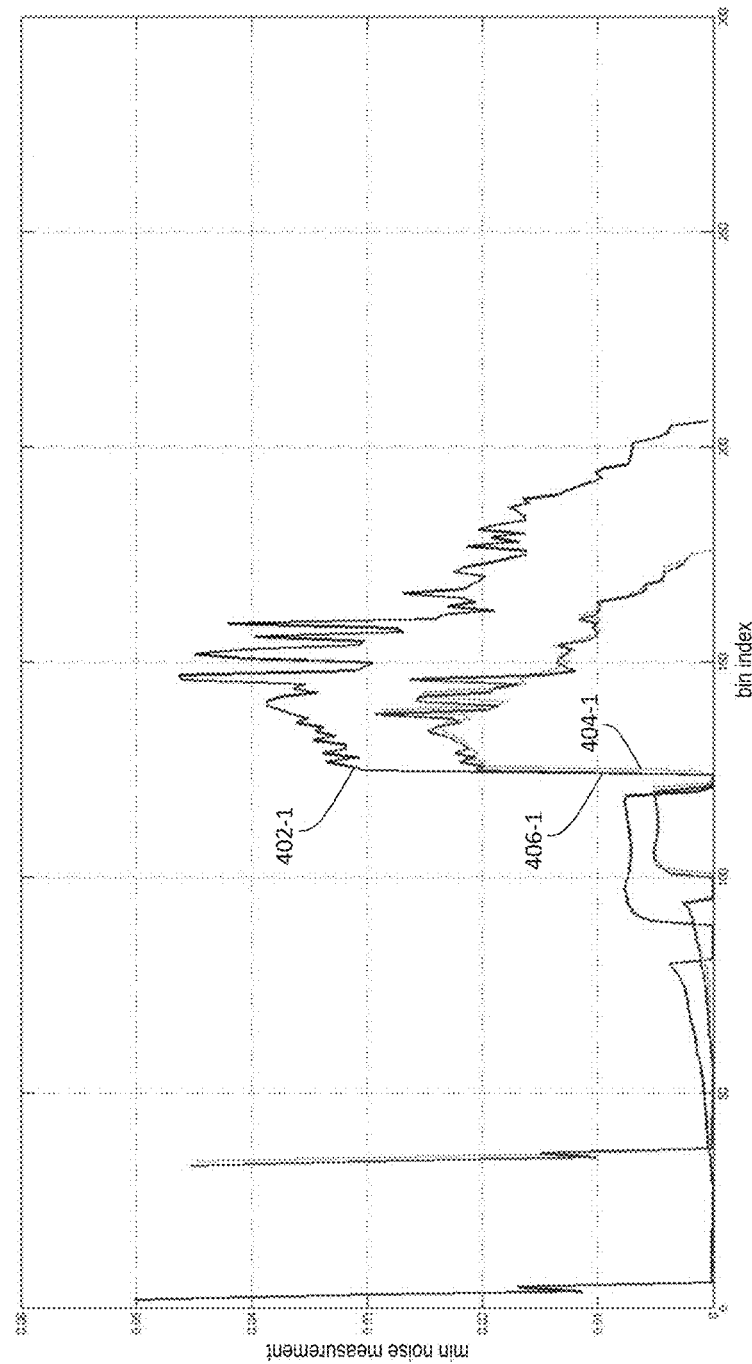

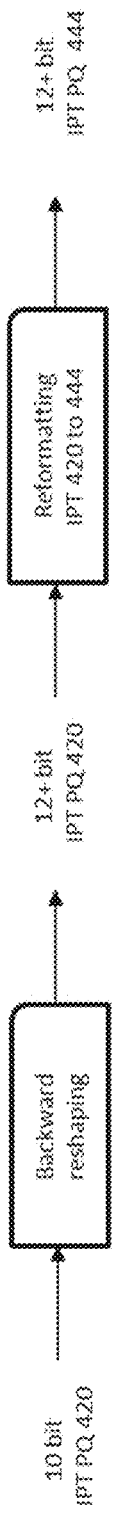
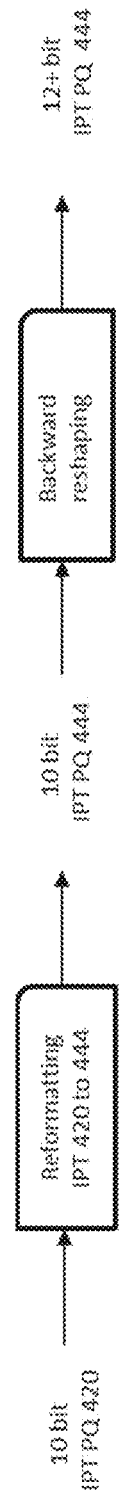
FIG. 7A
FIG. 7B calculate slopes of a DRNLS function at
pre-scaled codeword locations 922 map, based on the DRNLS function, individual
pre-scaled codeword locations in the pre-scaled
codeword locations into scaled codeword
locations 924 determine, based on the pre-scaled noise levels
and the slopes of the DRNLS function, deduced
noise levels in scaled codeword bins for the
scaled image 926

FIG. 9B

EFFICIENT IMAGE PROCESSING ON CONTENT-ADAPTIVE PQ SIGNAL DOMAIN

CROSS-REFERENCE TO RELATED APPLICATION(S)

The present application claims priority to U.S. Provisional Patent Application No. 62/255,703, filed on Nov. 16, 2015, and European Patent Application No. 15200054.3, filed Dec. 15, 2015, both of which are incorporated herein by reference in their entirety.

TECHNOLOGY

The present invention relates generally to images. More particularly, an embodiment of the present invention relates to efficient image processing of Content-Adaptive perceptually Quantized (CAQ) images.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the perceptual quantization of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1A depicts an example process for a video delivery pipeline;

FIG. 1B depicts an example process for data compression using content-adaptive quantization or reshaping in accordance with example embodiments disclosed herein;

FIG. 4A and FIG. 4B illustrate examples of collecting/mapping noise measurements in an original domain into noise measurements in a dynamic range non-linear scaling (DRNLS) domain;

FIG. 7A and FIG. 7B illustrate example chroma reformatting and chroma reshaping operations;

FIG. 9A through FIG. 9E illustrate example process flows; and

DESCRIPTION OF EXAMPLE EMBODIMENTS

Figure 2:
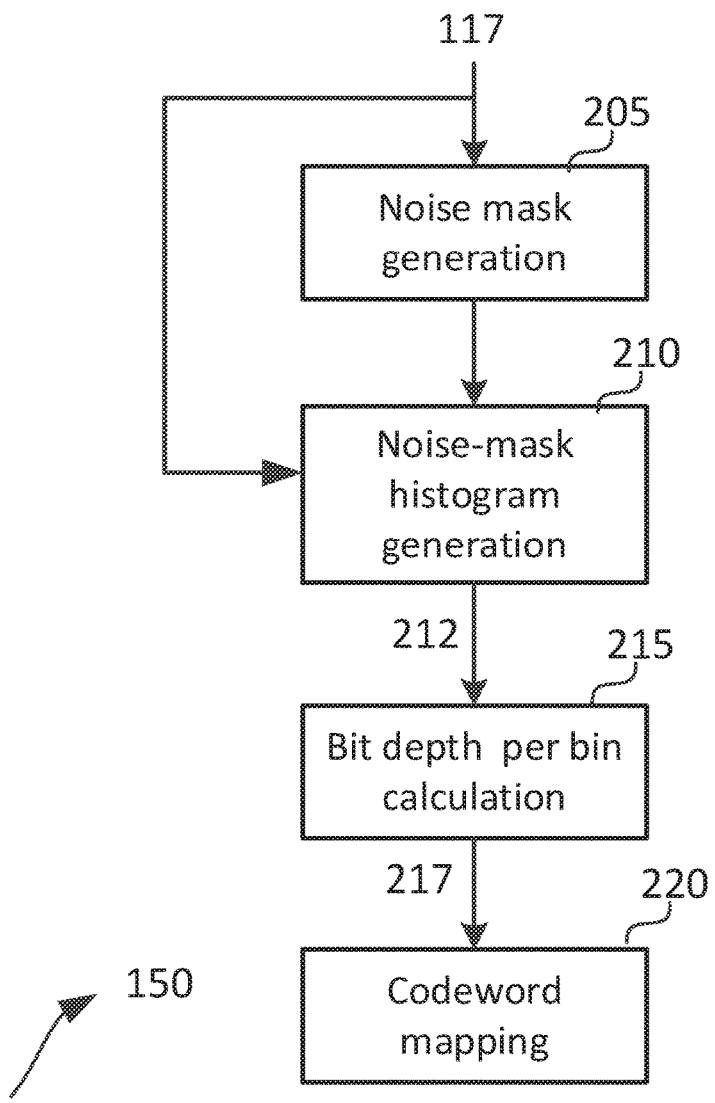
FIG. 2 depicts an example process for content-adaptive perceptual quantization in accordance with example embodiments disclosed herein.

Efficient image processing of Content-Adaptive perceptually Quantized (CAQ) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to efficient image processing such as image merging and/or graphics blending of CAQ images. A first and second forward reshaping function are obtained for re-quantizing a first and second pre-reshaped image respectively. A first and second backward reshaping function are obtained for reversing the operation of the first and second forward reshaping function respectively. A further forward reshaping function is generated. A first combined reshaping function is derived based on the further forward reshaping function and the first backward reshaping function. A second combined reshaping function is derived based on the further forward reshaping function and the second backward reshaping function. Based on the first combined reshaping function, the first reshaped image is mapped into a first mapped image. Similarly, based on the second combined reshaping function, the second reshaped image is mapped into a second mapped image. The first mapped image and the second mapped image are combined into a combined image. The combined image may be a merged image or a graphically blended image.

Example embodiments described herein relate to efficient image processing such as tone mapping CAQ images. A dynamic range non-linear scaling (DRNLS) function for tone mapping of images is obtained. A derivative of the DRNLS function is determined. A noise mask image is generated comprising a masking noise estimate for each pixel in an input image. A first noise mask histogram is generated, wherein for each bin, pixels in the input image are identified which have pixel values in the range associated with said bin, and the minimum value of the noise mask image pixels corresponding of the identified pixels is selected as the bin value for said bin. A forward reshaping function for re-quantizing the input image is generated. A second noise masking histogram is generated by multiplying the determined derivative of the DRNLS function and the first noise masking histogram. A minimal bit depth is determined for each bin of the second noise mask histogram based on the bin value of said bin, and the forward reshaping function is computed based on the determined minimal bit depth. The forward reshaping function is applied to the input image to obtain a tone mapped image.

Example embodiments described herein relate to efficient image processing such as transcoding of CAQ images. A video transcoder system decodes a reshaped video bitstream generated by a video encoder system into one or more forward reshaped images. The one or more forward reshaped images have been generated by the video encoder system from one or more wide dynamic range images of an initial transmission package based on a forward reshaping function. The reshaped video bitstream is encoded with image metadata defining a backward reshaping function that is related to the forward reshaping function. The video transcoder system generates one or more compressed forward reshaped images based on the one or more forward reshaped images without generating intermediate backward reshaped images by backward reshaping the one or more forward reshaped images based on the backward reshaping function. The video transcoder system encodes into a second reshaped video bitstream (a) the one or more compressed forward reshaped images and (b) the image metadata defining the backward reshaping function. The video transcoder system outputs the second reshaped video bitstream to one or more video decoder systems.

Example embodiments described herein relate to efficient image processing such as performing image transform operations on CAQ images within a reshaped domain. An image processing device receives one or more forward reshaped images generated by an image forward reshaping device. The one or more forward reshaped images are generated by the image forward reshaping device from one or more wide dynamic range images based on a forward reshaping function. The forward reshaping function relates to a backward reshaping function. The image processing device performs one or more image transform operations on the one or more forward reshaped images to generate one or more processed forward reshaped images without generating intermediate backward reshaped images by backward reshaping the one or more forward reshaped images or by backward reshaping one or more processed forward reshaped images based on the backward reshaping function. The image processing device sends the one or more processed forward reshaped images to a second image processing device.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Quantization

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m$^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of PQ mapping functions (or EOTFs) is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model.

For example, under SMPTE ST 2084, at 1 cd/m$^2$, one 12-bit code value corresponds to a relative change of approximately 0.0048 cd/m$^2$; however, at 1,000 cd/m$^2$, one 12-bit code value corresponds to a relative change of approximately 2.24 cd/m$^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065 (October 2014), which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptually quantization of images based on their content.

FIG. 1B depicts an example process for adaptive PQ according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ) (162), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

Adaptive PQ

FIG. 2 depicts an example process for content-adaptive perceptual quantization according to an embodiment of this invention. As depicted in FIG. 2, given a sequence of images (e.g., video frames) (117), block (205) is used to generate a noise mask image which characterizes each pixel in the input image in terms of its perceptual relevance in masking quantization noise. The noise mask image, in combination with the original image data, is used in step (210) to generate a noise mask histogram (212). Block (215) estimates the number (217) of minimum bits required for each bin of the histogram generated in step (210), and finally, codeword mapping block (220) computes the mapping function to translate the input signal (117) to its quantized output. Each of these steps is described in more detail next.

Noise Mask Generation

The basic idea of adaptive PQ is to allocate fewer bits in areas of the image that are noisy or have high texture, and more bits in areas of the image that are perceived as noise-free or smoother. Given an input image (117), the noise-mask generation block (205) generates an estimate of masking noise for each pixel in the image. In some embodiments, input (117) may be already coded using a gamma or PQ-based quantizer. In some other embodiments, input image (117) may be in linear space.

Some examples of generating noise masks are described in Provisional U.S. Patent Application No. 62/126,925 entitled "CONTENT-ADAPTIVE PERCEPTUAL QUAN- TIZER FOR HIGH DYNAMIC RANGE IMAGES" by JAN FROEHLICH, GUAN-MING SU, ROBIN ATKINS, SCOTT DALY and JON SCOTT MILLER, filed on Mar. 2, 2015; and Provisional U.S. Patent Application No. 62/187,091 entitled "REAL-TIME CONTENT-ADAPTIVE PERCEPTUAL QUANTIZER FOR HIGH DYNAMIC RANGE IMAGES" by GUAN-MING SU, filed on Jun. 30, 2015. The above-mentioned patent applications are hereby incorporated by reference as if fully set forth herein.

Let $I_{jp}$ denote the p-th pixel of a color component under quantization (e.g., luminance) in the j-th frame in the input sequence (117), normalized to [0 1). Let $v_{Lj}$ and $v_{Hj}$ denote the minimum and maximum pixel values in this frame, or $$v_{Lj}=\min\{I_{jp}\},$$
$$v_{Hj}=\max\{I_{jp}\}. \quad (1)$$

In some embodiments, a first low-pass filter is applied to image frame $I_j$. In an embodiment, this filter mimics the characteristics of the human visual system. Depending on the available computational power, this filter may range from a very simple filter, like a Box filter or a Gaussian filter, to more complex filter banks, like those implementing the Cortex transform. In an embodiment, the first filter may be a two-dimensional Gaussian filter $G(r_L, \sigma_L^2)$ with support range $r_L$ and variance $\sigma_L^2$ (e.g., $r_L=9$ and $\sigma_L^2=3$ or $r_L=33$ and $\sigma_L^2=4$). Then, its output (L) may be expressed as $$L_{jp}=I_{jp}\otimes G(r_L,\sigma_L^2), \quad (2)$$

where the symbol $\otimes$ denotes a convolution. Given the output of the first filter, the high frequencies components of the input frame may be extracted as $$\tilde{H}_{jp}=|I_{jp}-L_{jp}|. \quad (3)$$

These high frequencies components may then be filtered again by a second low-pass filter to generate the noise mask (H). This is to address the low-phase accuracy of HVS masking (that is, there is still masking at the zero crossings of a masking signal). In an embodiment, the second LPF may also be a Gaussian filer with support range $r_H$ and variance $\sigma_H^2$ (e.g., $r_H=9$, $\sigma_H^2=3$). Then, the noise mask (H) may be expressed as $$H_{jp}=\tilde{H}_{jp}\otimes G(r_H,\sigma_H^2). \quad (4)$$

In an embodiment, the parameters of the first and second low pass filters may be the same. In a preferred embodiment, the first and second low-pass filters are separable filters to improve computational efficiency. In an embodiment, an optional step may be used to identify $H_{jp}$ pixels that can be ignored in subsequent processing since they may bias the adaptive quantization process. For example, if the image includes a letterbox frame (that is, black pixels that may frame the original image so that it conforms to a particular frame size or aspect ratio), then values related to the letterbox pixels may be ignored. Values related to image boundaries or letterbox boundaries may also be ignored since the output of the low-pass filters assumes that data at these borders are padded with constant values, which will generate lower noise values. Let $\Omega_j$ denote the set of all valid pixels under considerations, then the final output noise mask (322) may be expressed as $$H_j(i), i \in \Omega_j. \quad (5)$$

Noise Mask Histogram Generation

Let $B_I$ denote the bit depth of the input image (117) (e.g., $B_I=16$) and let $K=2^{B_I}$, then the dynamic range 0 to K−1 may be partitioned into M bins of equal pixel interval values W, that is W=K/M. In an embodiment, for the j-th frame, a noise histogram $b_j(m)$, where m denotes the m-th histogram bin (m=0, 1, 2, . . . M−1), may be generated as follows:

a) Identify all pixels in the original image ($I_{ji}$, i∈$\Omega_j$) which have pixel values in the range $$\left[\frac{m}{M}, \frac{m+1}{M}\right).$$

b) Among those pixels, select the minimal $H_j(i)$, since, as described earlier, the masking elevation is not a 2D map. Or, given $$\Psi_{j,m} = \left\{i \bigg| \frac{m}{M} \le I_{ji} < \frac{m+1}{M}\right\}, \quad (6)$$
$$b_j(m) = \min\{H_j(i) | i \in \Psi_{j,m}\}.$$

Note that sometimes certain bins may be empty, since there might not be any image pixels within the bin's pixel range. The indices of these bins may be stored and their state will be addressed later.

Adaptive PQ values may be adjusted at the frame level or at the scene level. As used herein, the terms 'scene' or 'shot' for a video sequence may relate to a series of consecutive frames in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F frames, and frame-based noise-masking histograms $b_j(m)$, a scene-based noise-masking histogram b(m) may be derived as $$b_m=\min\{b_j(m)|j=0,1,\ldots,F-1\}. \quad (7)$$

In an embodiment, assuming a noise upper bound of 1, noise bins for which there are no pixels values for the entire scene may be assigned the maximum possible noise level value, 1. In some embodiments, missing bins may also be interpolated from neighboring bins. For j=0, 1, 2, . . . , F−1, scene-based minimum and maximum pixel values may also be generated as $$v_L=\min\{v_{Lj}\},$$
$$v_H=\max\{v_{Hj}\}. \quad (8)$$

Bit Depth Per Histogram-Bin Calculation

Given the noise level $b_m$ for each bin in the noise-mask histogram, the next step would be to determine the number of bits that need to be allocated for each bin. In an embodiment, such a mapping may be determined based on experimental user study results. For example, in one such study, users were shown to evaluate test images quantized to different bit depths, where Gaussian noise was added to the images before the quantization. Image regions with higher levels of mask noise can achieve full visual transparency at smaller bit depths. Alternatively, the smoother the image, the more bit depth is needed for an accurate and perceptually losses representation.

Consider a set of data pairs ($\tilde{N}_i, \tilde{Q}_i$), i=1, 2, 3, . . . , N, where for the i-th input noise level $\tilde{N}_i$ it has been determined (e.g., via user studies or other techniques) that the corresponding minimal bit depth is $\tilde{Q}_i$. In an embodiment, these pairs can be expressed as a masking-noise to bit depth function $$Q_m = f_N(b_m). \quad (9)$$

For example, without limitation, using simple linear interpolation, for $$\tilde{N}_n \le b_m \le \tilde{N}_{n+1}, Q_m = \tilde{Q}_n - (\tilde{Q}_n - \tilde{Q}_{n+1})\frac{b_m - \tilde{N}_n}{\tilde{N}_{n+1} - \tilde{N}_n}. \quad (10)$$

In an embodiment, the $Q_m = f_N(b_m)$ mapping may be computed using a look-up table. In an embodiment, it may be more convenient to perform codeword mapping (220) based on the number of required codewords within a histogram bin instead of using the bit depth data directly. This is examined in the next section.

Codeword Mapping Generation

Let $B_T$ denote the target bit depth for the re-quantized signal (152) (e.g., $B_T=10$ bits/pixel per color component), then the output will be mapped using $2^{B_T}$ codewords. In an embodiment, the range of codewords is normalized to one, hence let $$D_m = \left(\frac{2^{Q_m}}{2^{B_T}}\right)/2^{B_I}. \quad (11)$$

denote the number of normalized codewords per bin m. For example, if $Q_m=9$, $B_I=16$ and $B_T=10$, then $D_m=2^{-17}$.

Let $$d_i = D_m \text{ for } (m-1)W \le i < mW, \quad (12)$$

denote the number of normalized codewords per input $i \in (0, 2^{B_I}-1)$, then $d_i$ can be considered a lower bound for the number of required codewords per input codeword. The total number of normalized codewords for all input codewords, D, is bounded by 1, or $$D = \sum_{i=v_L}^{v_H} d_i \le 1. \quad (13)$$

Let $U=1-D$ denote the number of unused normalized codewords. These unused codewords need to be reassigned to input codewords according to a given criterion. In an embodiment, without limitation, any one (or a combination thereof) of the following allocation schemes may be employed:

i) Proportional allocation

Under this criterion, for input $v_L \le i \le V_H$ additional codewords are assigned based on the existing distribution, or $$\tilde{d}_i = d_i + U\frac{d_i}{D}, \quad (14)$$

where $\tilde{d}_i$ denotes the updated number of normalized codeword values.

ii) Constant offset allocation

Under this criterion, excess codewords are evenly distributed, or for input $v_L \le i \le v_H$, $$\tilde{d}_i = d_i + \frac{U}{v_H - v_L}. \quad (15)$$

iii) Histogram-based allocation

Let $h_i$ denote the histogram of the original input image, that is for $v_L \le i \le v_H$, $h_i = k$ denotes that out of P pixels there are k pixels with the value i. Then, under this criterion, the codewords are assigned according to the histogram values, or for input $v_L \le i \le v_H$ $$\tilde{d}_i = d_i + U\frac{h_i}{P}. \quad (16a)$$

In a variation, one may divide the input range into M sub-ranges (e.g., for M=3, blacks, mid-tones, and highlights) and compute histogram $H_m$ (m=1, 2, ..., M) denoting the total number of input pixels within the m-th sub-range, then, for i belonging in the m-th pixel sub-range $$\tilde{d}_i = d_i + U\frac{H_m}{P}. \quad (16b)$$

iv) Scalar-based Allocation

This can be considered a combination of the histogram-based allocation (e.g., consider a histogram with only two bins; one for darks and one for highlights) with the constant offset allocation. Let $\alpha$ denote a parameter between 0 and 1 denoting the relative importance of "darks" versus "highlights," then, for input $v_L \le i \le v_H$, under this criterion $$\tilde{d}_i = d_i + \alpha\left(\frac{U}{v_H - v_L}\right) + (1-\alpha)(i - v_L)\left(\frac{U}{v_H - v_L}\right). \quad (17)$$

If U=0, then no redistribution of codewords is possible. Under such a scenario, as will be discussed later on as well, an encoder may decide to either increase the target bit depth, add noise to the input image to effectively reduce the $d_i$ distribution, or do nothing and rely on the decoder and post-processing filtering to reduce the observable quantization noise. The remaining processing steps may operate directly on the $\tilde{d}_i$ data, however, in an embodiment, these data may be smoothed by a low pass filter, e.g., a 2N+1-tap averaging filter, for improved performance.

$$\text{Let } \tilde{s}_i = 0, \text{ for } i < v_L \text{ and } i > v_H \quad (18)$$

and $$\tilde{s}_i = \frac{1}{2N+1}\sum_{k=-N}^{N} a_k \tilde{d}_{i+k}, \text{ otherwise}$$

where $a_k$, k=-N, -N+1, ..., N, denotes the filter coefficients of the smoothing filter $$\left(\text{e.g., } a_k = \frac{1}{2N+1}\right).$$

In an embodiment, the length of this filter is large enough to span at least the size of two consecutive bins of the noise-mask histogram (e.g., N=W). Larger filters will provide better smoothing, but require more computational power.

In some cases, the sum of $\tilde{s}_i$ values may exceed 1, hence, these values needs to be re-normalized again, as $$S = \sum_{i=v_L}^{v_H} \tilde{s}_i, \quad (19)$$

$$s_i = \frac{\tilde{s}_i}{S}.$$

Values of $s_i$ should still satisfy the lower bound constraint, namely $$s_i \geq d_i \text{ for } v_L \leq i \leq v_H \quad (20)$$

Given $$FL(i) = \sum_{k=0}^{i} s_k \quad (21)$$

then, in the j-th frame, for a given input pixel $I_{jp}=i$ ($i\in(0, 2^{B_I}-1)$) the final, normalized, re-quantized pixel value $s_{jp}$ may be expressed as:

$$s_{jp} = \begin{cases} 0, & \text{if } i < v_L \\ 1, & \text{if } i > v_H \\ FL(i), & \text{if } v_L \leq i \leq v_H \end{cases} \quad (22)$$

In an embodiment, FL(i) values may be stored in a pre-computed look-up table (LUT). Alternatively, normalized $s_{jp}$ values may also be mapped to de-normalized values in the range 0 to $2^{B_T}-1$.

Frame-Based Adaptive Quantization

As discussed earlier, according to equation (7), in an embodiment, adaptive quantization may be based on noise-masking histogram data collected across multiple frames in a scene. Collecting data across multiple frames may introduce significant delay which may be unacceptable in an environment when adaptive quantization needs to be performed in real-time. In another embodiment, codeword mapping (or reshaping) may be performed using data from the first frame in a scene; however, the mapping may be adjusted periodically to accommodate for small variations within the frames of the scene.

Backward Reshaping

In some embodiments, backward reshaping (160) may be applied to reverse the effects of forward reshaping (150). In an embodiment, a look-up table for inverse quantization may be constructed as follows:
a) For each codeword in the quantized domain ($s_c$), identify all input codewords ($v_i$) for which $FL(v_i)=s_c$. Let this group be denoted as $\omega(s_c)=\{v_i|FL(v_i)=s_c\}$; then
b) Construct the backward reshaping function ($BL(s_c)$) as a function of $\omega(s_c)$.

For example, in an embodiment, without limitation, $BL(s_c)$ may be constructed as the average of all codewords that belong to $\omega(s_c)$, or $$\text{if } |\omega(s_c)| > 0 \text{ then} \quad (23)$$

$$BL(s_c) = \frac{\sum_{i \in \omega(s_c)} v_i}{|\omega(s_c)|}$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values.

Alternative Representation for Noise Measurement

The noise mask (H) in expression (4) can be represented in an alternative representation as follows. Denote the support region and the filter coefficient of the first Gaussian filter $G(r_L,\sigma_L^2)$ respectively as $\Lambda_L$ and $g_L(i)$ (where $g_L(i)>0$; $i\in\Lambda_L$). Then, its output (L) may be expressed as:

$$L_j(p) = \sum_{i \in \Lambda_L} g_L(i) \cdot I_j(p+i) \quad (24)$$

The high frequency component of the input frame (or the j-th input frame), $\tilde{H}_j(p)$ is as follows:

$$\tilde{H}_j(p) = \left| I_j(p) - \sum_{i \in \Lambda_L} g_L(i) \cdot I_j(p+i) \right| \quad (25)$$

Denote the support region and the filter coefficient of the second Gaussian filter $G(r_H,\sigma_H^2)$ respectively as $\Lambda_H$ and $g_H(i)$ (where $g_H(i)>0$; $i\in\Lambda_H$). Then, the noise mask (H) may be expressed as:

$$\begin{aligned} H_j(p) &= \sum_{k \in \Lambda_H} g_H(k) \cdot \tilde{H}_j(p+k) \\ &= \sum_{k \in \Lambda_H} g_H(k) \cdot \left| I_j(p+k) - \sum_{i \in \Lambda_L} g_L(i) \cdot I_j(p+i+k) \right| \\ &= \sum_{k \in \Lambda_H} \left| g_H(k) \cdot I_j(p+k) - \sum_{i \in \Lambda_L} g_H(k) \cdot g_L(i) \cdot \right. \\ &\quad \left. I_j(p+i+k) \right| \end{aligned} \quad (26)$$

The result is basically that the noise mask (H) at a pixel p can be represented as a weighted linear combination of pixel values of pixel p and its neighbors.

Image Merging

A plurality of input images, for example N (N>1) input images, that possibly have different CAQ reshaping functions (e.g., curves, lookup tables or LUTs, etc.) may be merged together to form a single new merged image. In some embodiments, each pixel in the new merged image is unaltered from a pixel of one of the input images. Examples of image merging include, but are not necessarily limited to only, any of: placing graphics on top of some areas of an input image (or graphics overlap), image cropping, combining stereo images that possibly have two different CAQ reshaping functions into an image of a side-by-side format (or another format used in stereo video coding), etc.

Figure 3A:
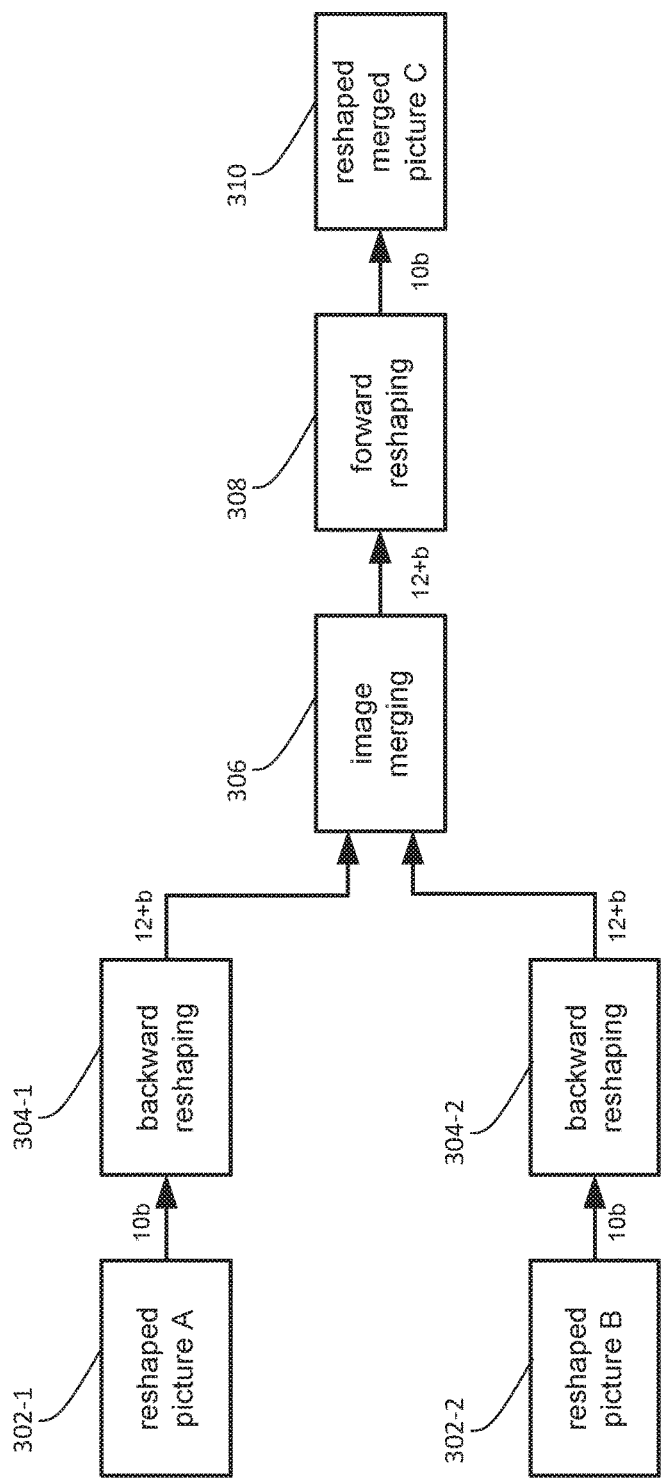
FIG. 3A through FIG. 3C illustrate example image merging.

FIG. 3A illustrates an example pipeline for performing image merging under other approaches. In an example, input images to be merged comprise a first input image 302-1 generated by forward reshaping a first wide dynamic range image based on a first forward reshaping function. The first forward reshaping function may be constructed based on first noise measurements (e.g., represented in a noise mask as described herein, etc.) determined for the first wide dynamic range image. The input images further comprise a second input image 302-2 generated by forward reshaping a second wide dynamic range image based on a second forward reshaping function. The second forward reshaping function may be constructed based on second noise measurements (e.g., represented in a noise mask as described herein, etc.) determined for the second wide dynamic range image. The input images may be (e.g., 8-bit, 9-bit, 10-bit, 11-bit, etc.) images represented in a reshaped domain of any (e.g., fixed, constant, etc.) bit depth (e.g., 8 bits, 9 bits, 10 bits, 11 bits, etc.). The first forward reshaping function and the second forward reshaping function may be different as the first noise measurements related to the first wide dynamic range image is different from the second noise measurements related to the second wide dynamic range image.

In some embodiments, a first backward reshaping operation 304-1 is performed on the first input image (302-1) to convert the first input image (302-1) into a first backward reshaped image (e.g., a higher bit depth image, a 12+ bit image, represented in a pre-reshaped domain, etc.). The first backward reshaping operation (304-1) may be based on a first backward reshaping function that is related to the first forward reshaping function.

Similarly, a second backward reshaping operation 304-2 is performed on the second input image (302-2) to convert the second input image (302-2) into a second backward reshaped image (e.g., a higher bit depth image, a 12+ bit image, represented in a pre-reshaped domain, etc.). The second backward reshaping operation (304-2) may be based on a second backward reshaping function that is related to the second forward reshaping function.

In some embodiments, an image merging operation 306 is performed to merge the first backward reshaped image (e.g., a 12+ bit image, etc.) and the second backward reshaped image (e.g., a 12+ bit image, etc.) into an intermediate merged image (e.g., a higher bit depth image, a 12+ bit image, etc.), which may be represented in a pre-reshaped domain in which the first backward reshaped image and the second backward reshaped image are represented. Additionally, optionally, or alternatively, a forward reshaping operation 308 is performed on the intermediate merged image (e.g., a higher bit depth image, a 12+ bit image, represented in the pre-reshaped domain, etc.) to generate a reshaped merged image 310 in the reshaped domain. The forward reshaping operation (308) may be based on a forward reshaping function specifically determined/constructed for the intermediate merged image. To determine/construct the forward reshaping function, new noise measurements may be measured and determined by convolving Gaussian filters (e.g., $G(r_L, \sigma_L^2)$, $G(r_H, \sigma_H^2)$) as described herein with image content of the intermediate merged image. The forward reshaping function may be generated based on the new noise measurements determined for the intermediate merged image based on codeword allocation techniques as described herein.

By way of example but not limitation, noise measurements for the $n^{th}$ input image of N input images may be denoted as $\{b_{n,m}\}$. In some embodiments, noise measurements for a merged image that is generated by merging the N input images may be determined without actually generating an intermediate merged image (e.g., a higher bit depth image, a 12+ bit image, represented in a pre-reshaped domain, etc.) and without convolving Gaussian filters (e.g., $G(r_L, \sigma_L^2)$, $G(r_H, \sigma_H^2)$) with the intermediate merged image by taking the minimum noise measurements among all noise measurements for the N input image in each codeword bin (e.g., m-th bin in M codeword bins) as follows:

$$b_m = \min\{b_{n,m} | n=0,1, \ldots, N-1\} \quad (27)$$

The forward reshaping function for the intermediate merged image, which may not be actually generated in the improved pipeline, can be built using the new noise measurement as determined in expression (27).

Figure 3B:
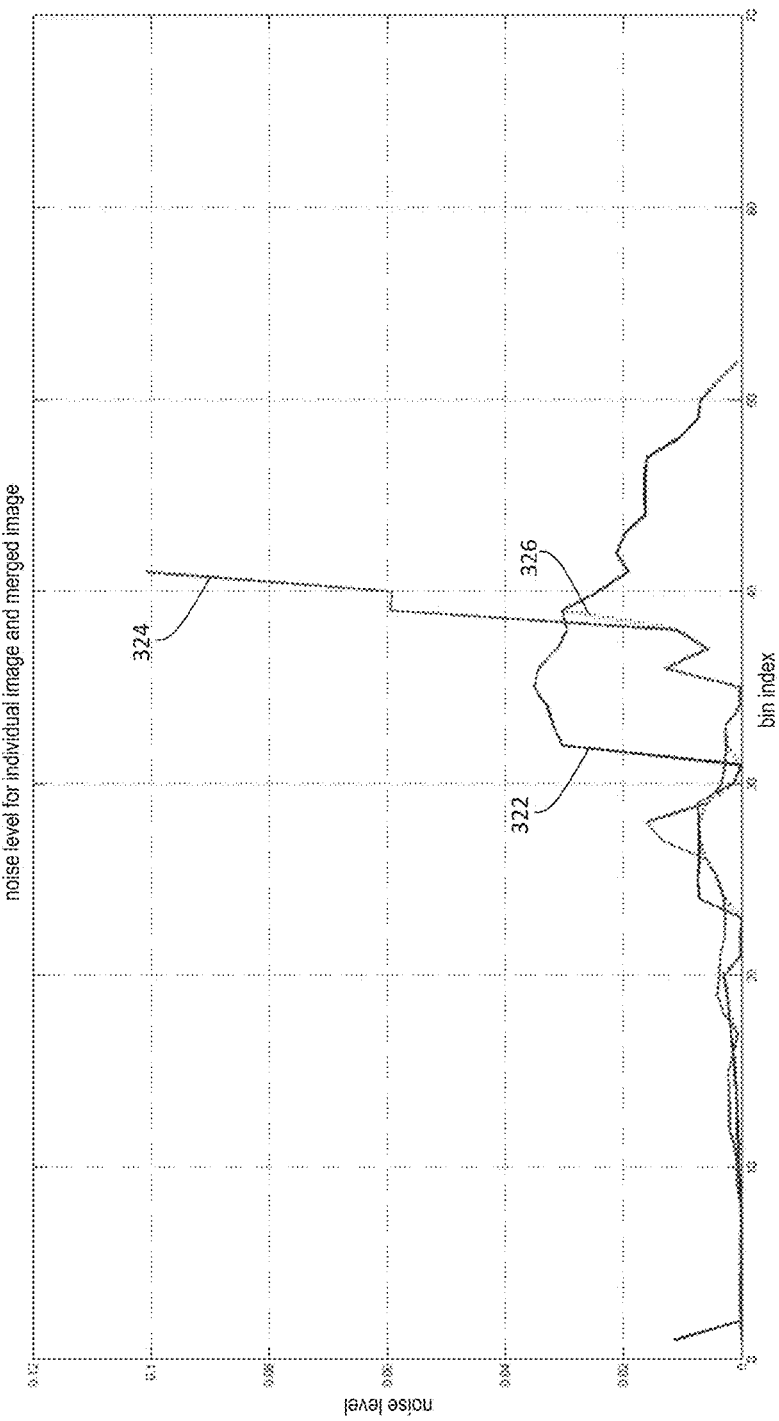

FIG. 3B illustrates example noise measurements 326 that can be used to generate a forward reshaping function for a merged image. For the purpose of illustration, the merged image is to be generated by merging a first input image (e.g., 302-1 of FIG. 3A or FIG. 3B, etc.) and a second input image (e.g., 302-2 of FIG. 3A or FIG. 3B, etc.).

The first input image (302-1) may be a forward reshaped image generated by forward reshaping a first wide dynamic range image based on a first forward reshaping function. The first forward reshaping function may be constructed based on first noise measurements 322 derived from convolving Gaussian filters (e.g., $G(r_L, \sigma_L^2)$, $G(r_H, \sigma_H^2)$) with image content of the first wide dynamic range image. The second input image (302-2) may be a forward reshaped image generated by forward reshaping a second wide dynamic range image based on a second forward reshaping function. The second forward reshaping function may be constructed based on second noise measurements 324 derived from convolving (e.g., the same) Gaussian filters (e.g., $G(r_L, \sigma_L^2)$, $G(r_H, \sigma_H^2)$) with image content of the second wide dynamic range image.

Under techniques as described herein, in some embodiments, the noise measurements (326) need not to be generated from a wide dynamic range merged image in a pre-reshaped domain different from a reshaped domain in which the first input image (302-1) and the second input image (302-2) are represented. Thus, the noise measurements (326) need not to be generated by convolving the Gaussian filters with such a wide dynamic range merged image in the pre-reshaped domain.

In an example, the noise measurements (326) may be generated by taking the lesser of the noise measurements (322) and the noise measurements (324), (as represented in the vertical axis in FIG. 3B), in each codeword bin of all codeword bins (as represented in the horizontal axis in FIG. 3B). The noise measurements (326) may then be used to construct a forward reshaping function based on codeword allocation techniques as described herein.

Since the forward reshaping function for the merged image can be directly derived from the noise measurements of the input images, content analysis, such as generating an intermediate merged image of a higher bit depth and convolving the intermediate merged image with Gaussian filters (e.g., $G(r_L, \sigma_L^2)$, $G(r_H, \sigma_H^2)$), for the merged image can be avoided. Generating the forward reshaping function is independent of and does not rely on image merging. Moreover, generating the forward reshaping function is independent of and does not rely on generating the intermediate merged image of the higher bit depth. This allows the forward reshaping function to be moved to earlier image transform operations before image merging. In some embodiments, the forward reshaping function generated based on the noise measurements of the input images can be merged with backward reshaping functions of the input image into combined reshaping functions. In other words, a corresponding combined reshaping function can be generated for each of the input images by merging a backward reshaping function for that input image and the forward reshaping function for the merged image.

For the purpose of illustration, denote the first input image (302-1), or input image A, in a reshaped domain as $A_{10}$. Denote the second input image (302-2), or input image B, in the reshaped domain as $B_{10}$. As used herein, "an image in a reshaped domain" may refer to a content-adaptive PQ reshaped image that is generated by forward reshaping a wide dynamic range image based on a forward reshaping function constructed by codeword allocation techniques as described herein.

Denote the first backward reshaping function for the first input image (302-1) and the second backward reshaping function for the second input image (302-2) respectively as $BL_A(\cdot)$ and $BL_B(\cdot)$. The first intermediate image $A_{12}$ after backward reshaping the first input image (302-1) based on the first backward reshaping function and the second intermediate image $B_{12}$ after backward reshaping the second input image (302-2) based on the second backward reshaping function are expressed respectively as follows:

$$A_{12}=BL_A(A_{10}) \quad (28\text{-}1)$$

$$B_{12}=BL_B(B_{10}) \quad (28\text{-}2)$$

In some embodiments, the image merging operation (306) may be represented as a function $F_{AB}(\cdot,\cdot)$. Then, the intermediate merge image is expressed as follows:

$$C_{12}=F_{AB}(A_{12},B_{12}) \quad (29)$$

The forward reshaping function of the merged image is denoted as $FL_C(\cdot)$. Then, the reshaped merge image (310) is expressed as follows:

$$C_{10}=FL_C(C_{12}) \quad (30)$$

The overall image merging process or pipeline (e.g., as represented in FIG. 3A, etc.) can be represented in an overall expression as follows:

$$C_{10}=FL_C(F_{AB}(A_{12},B_{12}))=FL_C(F_{AB}(BL_A(A_{10}),BL_B(B_{10}))) \quad (31)$$

In some embodiments, each pixel in the reshaped merged image (310) comes from either a pixel of the first input image (302-1) or a pixel of the second input image (302-2), as follows:

$$C_{10}(p)=FL_C(BL_A(A_{10}(p))) \quad (32\text{-}1)$$

Or $$C_{10}(p)=FL_C(BL_B(B_{10}(p))) \quad (32\text{-}2)$$

The forward reshaping function for the merged image and the first and second backward reshaping functions for the first and second input images (302-1 and 302-2) can be combined together into combined reshaping functions $CL_{CA}$ and $CL_{CB}$ as follows:

$$CL_{CA}=FL_C(BL_A(\cdot)) \quad (33\text{-}1)$$

$$CL_{CB}=FL_C(BL_B(\cdot)) \quad (33\text{-}2)$$

Thus, a simplified flow for image merging as compared with that of FIG. 3A may be represented by expressions as follows:

$$C_{10}(p)=CL_{CA}(A_{10}(p)) \quad (34\text{-}1)$$

$$C_{10}(p)=CL_{CB}(B_{10}(p)) \quad (34\text{-}2)$$

Figure 3C:
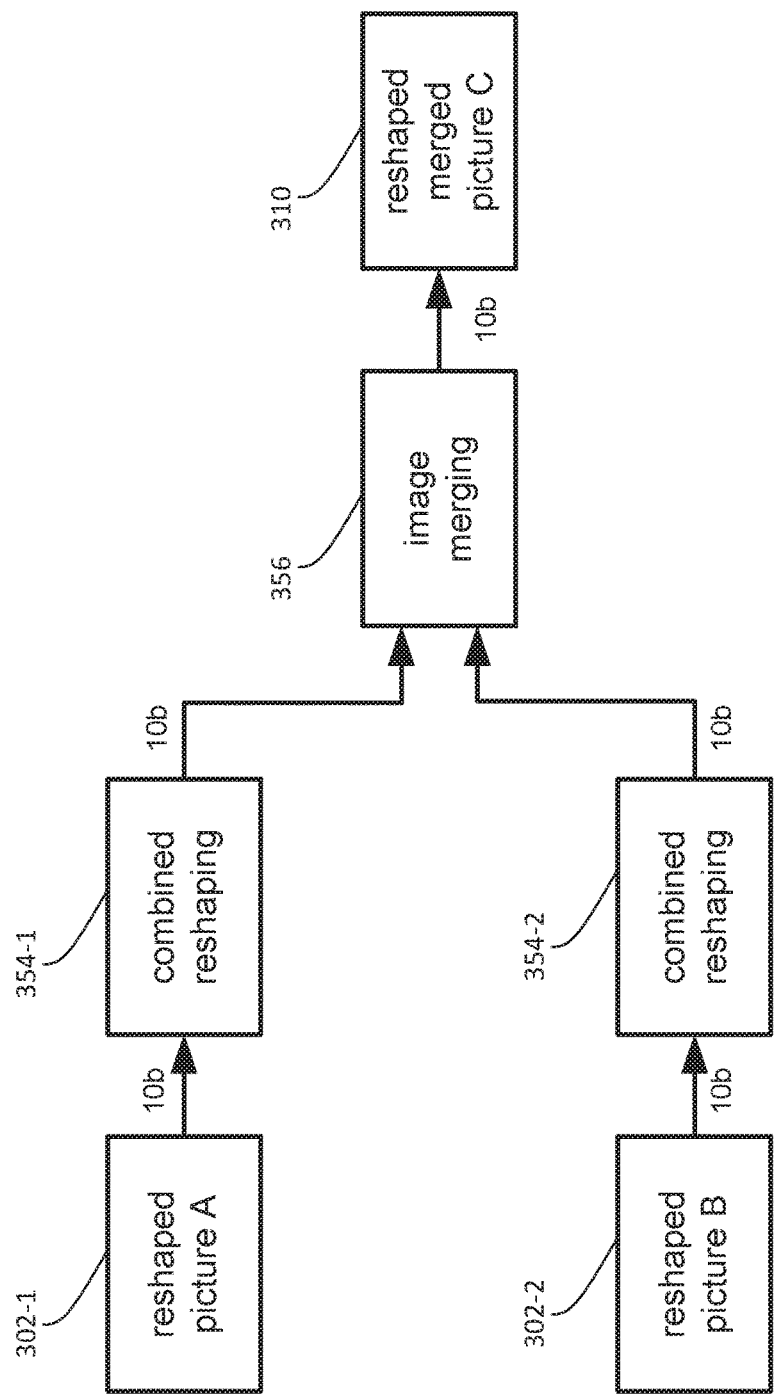

FIG. 3C illustrates an example improved pipeline for performing image merging. Under the improved pipeline of FIG. 3C, one or more computing intensive steps can be avoided based on the operational analysis as described herein.

In an example, input images to be merged comprise a first input image (e.g., 302-1, a 10 bit reshaped image, represented in a reshaped domain, etc.) generated by forward reshaping a first wide dynamic range image based on a first forward reshaping function. The first forward reshaping function may be constructed based on first noise measurements (e.g., represented in a noise mask as described herein, etc.) determined for the first wide dynamic range image. The input images further comprise a second input image (e.g., 302-2, a 10 bit reshaped image, represented in a reshaped domain, etc.) generated by forward reshaping a second wide dynamic range image based on a second forward reshaping function. The second forward reshaping function may be constructed based on second noise measurements (e.g., represented in a noise mask as described herein, etc.) determined for the second wide dynamic range image. The first forward reshaping function and the second forward reshaping function may be different as the first noise measurements related to the first wide dynamic range image is different from the second noise measurements related to the second wide dynamic range image.

In some embodiments, a first combined reshaping operation 354-1 is performed on the first input image (302-1) to convert the first input image (302-1) into a first combined reshaped image (e.g., a 10 bit image, etc.), which may be represented in the same reshaped domain in which the first input image (302-1) is represented. The first combined reshaping operation (354-1) may be based on a first combined reshaping function (e.g., $CL_{CA}$), which combines a first backward reshaping function that is related to the first forward reshaping function and a forward reshaping function determined/constructed for an intermediate merged image, where the intermediate merged image could be constructed by merging backward reshaped images derivable from backward reshaping the first input image (302-1) and the second input image (302-2).

However, techniques as described herein can be used to derive the forward reshaping function for the intermediate merged image without actually generating the backward reshaped images, without actually generating the intermediate merged image in the pre-reshaped domain, without content analysis (e.g., convolving with noise measuring Gaussian filters $G(r_L,\sigma_L^2)$ and $G(r_H,\sigma_H^2)$) of image content of the intermediate merged image, etc. For example, the forward reshaping function for the intermediate merged image can be derived based on expression (27), as illustrated in FIG. 3B. Further, the first combined reshaping function (e.g., $CL_{CA}$) can be derived based on expression (33-1).

In some embodiments, a second combined reshaping operation 354-2 is performed on the second input image (302-2) to convert the second input image (302-2) into a second combined reshaped image (e.g., a 10 bit image, etc.), which may be represented in the same reshaped domain in which the second input image (302-2) is represented. The second combined reshaping operation (354-2) may be based on a second combined reshaping function (e.g., $CL_{CB}$), which combines a second backward reshaping function that is related to the second forward reshaping function and the forward reshaping function determined/constructed for the intermediate merged image.

As mentioned, the forward reshaping function for the intermediate merged image can be derived based on expression (27), as illustrated in FIG. 3B. Further, the second combined reshaping function (e.g., $CL_{CB}$) can be derived based on expression (33-2).

In some embodiments, an image merging operation 356 is performed to merge the first combined reshaped image (e.g., a 10 bit image, etc.) and the second combined reshaped image (e.g., a 10 bit image, etc.) into a reshaped merged image (e.g., 310).

Tone Mapping

A non-linear function (denoted as $T_j(\cdot)$) can be used to perform tone mapping or dynamic range non-linear scaling (DRNLS). For the purpose of illustration only, pixel values such as luma codewords, etc., in a color space channel or component (e.g., Y, Cb, Cr, Dz, Dx, R, G, B, etc.) is normalized to [0 1). Given an input pixel value $I_j(p)$ in an original domain (e.g., a pre-DRNLS domain) for each pixel p, an output pixel value after DRNLS becomes $T_j(I_j(p))$ in a DRNLS domain. A noise measurement for pixel p can be collected from a codeword bin $\lfloor M \cdot I_j(p) \rfloor$ of the original domain in which the input pixel value $I_j(p)$ is represented into a codeword bin $\lfloor M \cdot T_j(I_j(p)) \rfloor$ of the DRNLS domain. That is, if pixel p is already in the m-th codeword bin of the original domain, then the new bin index of the codeword bin of the DRNLS domain is $\lfloor M \cdot T_j(m/M) \rfloor$.

For the noise measurement at pixel p, the noise measure from the second noise measuring Gaussian filter (e.g., $G(r_H, \sigma_H^2)$) in the input image in the original domain is given as follows:

$$H_j(p) = \sum_{k \in \Lambda_H} \left| g_H(k) \cdot I_j(p+k) - \sum_{i \in \Lambda_L} g_H(k) \cdot g_L(i) \cdot I_j(p+i+k) \right|$$

$$\equiv \sum_{k \in \Lambda_H} \left| g_H(k) \sum_{i \in \Lambda_L} g_L(i) \Delta I_j(p, i, k) \right| \tag{35}$$

where $$\Delta I_j(p, i, k) \equiv I_j(p+k) - I_j(p+i+k) \tag{36}$$

After the DRNLS operations, the pixel value becomes $T_j(I_j(p))$. A noise measure from the second noise measuring Gaussian filter (e.g., $G(r_H, \sigma_H^2)$) in the output image in the DRNLS domain is given as follows:

$$H'_j(p) = \sum_{k \in \Lambda_H} \left| g_H(k) \cdot T_j(I_j(p+k)) - \sum_{i \in \Lambda_L} g_H(k) \cdot g_L(i) \cdot T_j(I_j(p+i+k)) \right|$$

$$= \sum_{k \in \Lambda_H} \left| g_H(k) \cdot \sum_{i \in \Lambda_L} g_L(i)(T_j(I_j(p+k)) - T_j(I_j(p+i+k))) \right| \tag{37}$$

Assuming pixel values around pixel p have similar values (e.g., first order continuous, first order differentiable, locally linear, etc.), the difference of neighboring pixel values in the DRNLS domain may be approximated as follows:

$$T_j(I_j(p+k)) - T_j(I_j(p+i+k)) \approx T'_j(I_j(p+k)) \cdot \Delta I_j(p,i,k) \tag{38}$$

where $T'_j(x)$ is the first derivative of the scaling function $T_j(x)$ at x, and may be computed as follows:

$$T'_j\left(\frac{m}{M}\right) = \frac{T_j\left(\frac{m+1}{M}\right) - T_j\left(\frac{m}{M}\right)}{1/M} = M\left(T_j\left(\frac{m+1}{M}\right) - T_j\left(\frac{m}{M}\right)\right) \tag{39}$$

The noise measure from the second noise measuring Gaussian filter (e.g., $G(r_H, \sigma_H^2)$) in the output image in the DRNLS domain can be rewritten as follows:

$$H'_j(p) \approx \sum_{k \in \Lambda_H} \left| g_H(k) \cdot \sum_{i \in \Lambda_L} g_L(i) T'_j(I_j(p+k)) \Delta I_j(p, i, k) \right|$$

$$\approx T'_j(I_j(p+k)) \cdot H_j(p) \tag{40}$$

In other words, for each such pixel p, the noise measurement in the DRNLS domain becomes the first derivative of the scaling function (or the DRNLS function) at $I_j(p+k)$ (or $T'_j(I_j(p+k))$) times the noise measurement in the original domain. Accordingly, noise measurements in a codeword bin (of the DRNLS domain) corresponding to the m-th codeword bin of the original domain can be estimated from noise measurements in the m-th codeword bin of the original domain as follows:

$$\{b'_{\lfloor M \cdot T_j(m/M) \rfloor}\} = \left\{T'_j\left(\frac{m}{M}\right) \cdot b_m\right\} \tag{41}$$

Collecting/mapping noise measurement data from codeword bins (e.g., the m-th bin, etc.) of the original domain to (mapped) codeword bins (e.g., $\lfloor M \cdot T_j(m/M) \rfloor$, etc.) of the DRNLS domain may result in many-to-one collection/mappings. For example, multiple codeword bins of the original domain may be collected/mapped to the same (mapped) codeword bin of the DRNLS domain. If so, the lowest value (or the lowest noise level) of noise measurements in the multiple codeword bins may be used to compute/estimate the noise measurement in the mapped codeword bin of the DRNLS domain. On the other hand, the many-to-one collection/mappings also would result in some "hole", or codeword bins in the DRNLS domain that have no noise measurement values. Interpolation may be used to fill in noise measurements for these codeword bins in the DRNLS domain. A process of deriving noise measurements in the DRNLS domain based on noise measurements in the original domain is illustrated in TABLES 1 and 2 as follows:

TABLE 1

Collecting Noise Measurements to the DRNLS Domain

STEP 1:
Calculate the slope, $T_j'(\cdot)$ for the DR scaling function $T_j(\cdot)$ for all m = 0, 1, . . . , M − 1
STEP 2:
Calculate the new mapping location, $\lfloor M \cdot T_j(m / M) \rfloor$ for all m = 0, 1, . . . , M − 1
STEP 3:
Calculate the magnitude in the new mapping location
For k = 0, 1, . . . , M − 1
$\Theta_k = \{m \mid \lfloor M \cdot T_j(m / M) \rfloor = k, \forall m\}$ $\pi_k = \underset{m}{\operatorname{argmin}}\left\{T'_j\left(\frac{m}{M}\right) \cdot b_m \,\middle|\, m \in \Theta_k\right\}$ $\mu_k = b_{\pi_k}$

TABLE 1-continued

Collecting Noise Measurements to the DRNLS Domain $$b_k^S = T'_J\left(\frac{\pi_k}{M}\right) \cdot \mu_k$$

End

STEP 4:
Interpolate the missing points where $b_k^S=0$. Detailed algorithm please refer to TABLE 2 below

TABLE 2

Interpolation

```
for each bin k with b_k^S = 0
  find_L_flag = 0;
  find_R_flag = 0;
  // find the nearest valid left neighbor
  for(i = k; i >= 0; i --)
    if (b_k^S > 0)
      s_L = i;
      find_L_flag = 1;
      break;
    end
  end
  // find the nearest valid right neighbor
  for(i = k; i < M; i ++)
    if(b_k^S > 0)
      s_H = i;
      find_R_flag = 1;
      break;
    end
  end
  // linear interpolation
  if((find_L_flag == 1) && (find_R_flag == 1)
```

$$b_k^S = \frac{s_c - s_L}{s_H - s_L} b_{s_L}^S + \frac{s_H - s_c}{s_H - s_L} b_{s_H}^S$$

```
  else if((find_L_flag == 0) && (find_R_flag == 1))
    b_k^S = b_{s_H}^S
  else if((find_L_flag == 1) && (find_R_flag == 0))
    b_k^S = b_{s_L}^S
  else // all values are zeros, might not happen
end
```

Figure 4B:
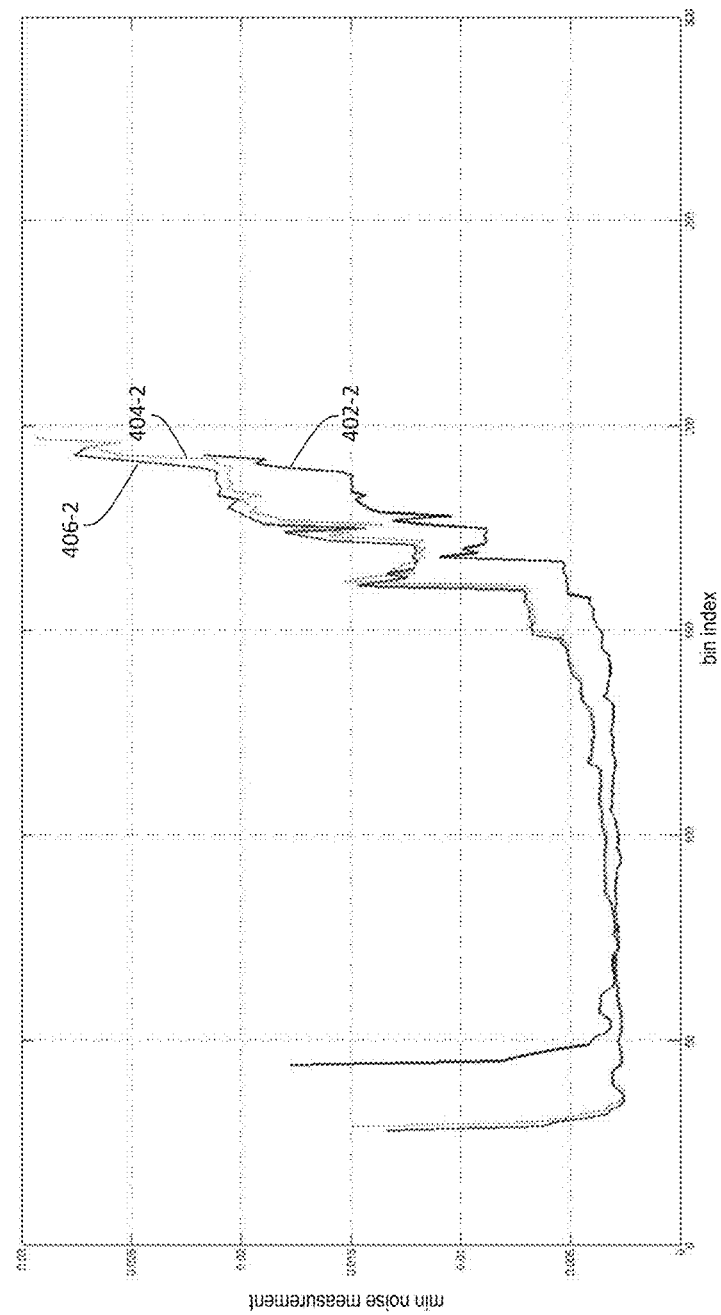

FIG. 4A and FIG. 4B illustrate two examples of collecting/mapping noise measurements in an original domain into noise measurements in a DRNLS domain.

As illustrated in FIG. 4A, noise measurements in codeword bins of the original domain for a first input image, which may be computed based on content analysis techniques as described herein, are represented by a first input noise measurement plot 402-1. Noise measurements in codeword bins of the DRNLS domain for a first output image as generated by applying a first DRNLS function to the first input image may be computed based on content analysis techniques (e.g., convolving image content of the first output image with noise measuring Gaussian filters $G(r_L, \sigma_L^2)$ and $G(r_H, \sigma_H^2)$, etc.) as described herein. These noise measurements are represented by a first output noise measurement plot 404-1. An estimate of the noise measurements in the codeword bins of the DRNLS domain for the first output image generated by applying the first DRNLS function to the first input image may also be computed without performing a content analysis of the first output image (e.g., convolving image content of the first output image with noise measuring Gaussian filters $G(r_L, \sigma_L^2)$ and $G(r_H, \sigma_H^2)$, etc.). For example, such an estimate of the noise measurements can be made using a product of the first-order derivatives of the first DRNLS function and the noise measurements (as represented by the first input noise measurement plot (402-1)) in the codeword bins of the original domain for the first input image, and is illustrated as a first estimated output noise measurement plot 406-1.

Similarly, as illustrated in FIG. 4B, noise measurements in codeword bins of the original domain for a second input image, which may be computed based on content analysis techniques as described herein, are represented by a second input noise measurement plot 402-2. Noise measurements in codeword bins of the DRNLS domain for a second output image as generated by applying a second DRNLS function to the second input image may be computed based on content analysis techniques (e.g., convolving image content of the second output image with noise measuring Gaussian filters $G(r_L, \sigma_L^2)$ and $G(r_H, \sigma_H^2)$, etc.) as described herein. These noise measurements are represented by a second output noise measurement plot 404-2. An estimate of the noise measurements in the codeword bins of the DRNLS domain for the second output image generated by applying the second DRNLS function to the second input image may also be computed without performing a content analysis of the second output image (e.g., convolving image content of the second output image with noise measuring Gaussian filters $G(r_L, \sigma_L^2)$ and $G(r_H, \sigma_H^2)$, etc.). For example, such an estimate of the noise measurements can be made using a product of the first-order derivatives of the second DRNLS function and the noise measurements (as represented by the second input noise measurement plot (402-2)) in the codeword bins of the original domain for the second input image, and is illustrated as a second estimated output noise measurement plot 406-2.

Graphics Blending

A plurality of input images, for example N (N>1) input images may be graphically blended together to form a single new blended image. In some embodiments, each pixel in the new blended image is derived as a combination from pixels of (e.g., all of, two or more of, etc.) the input images.

Figure 5A:
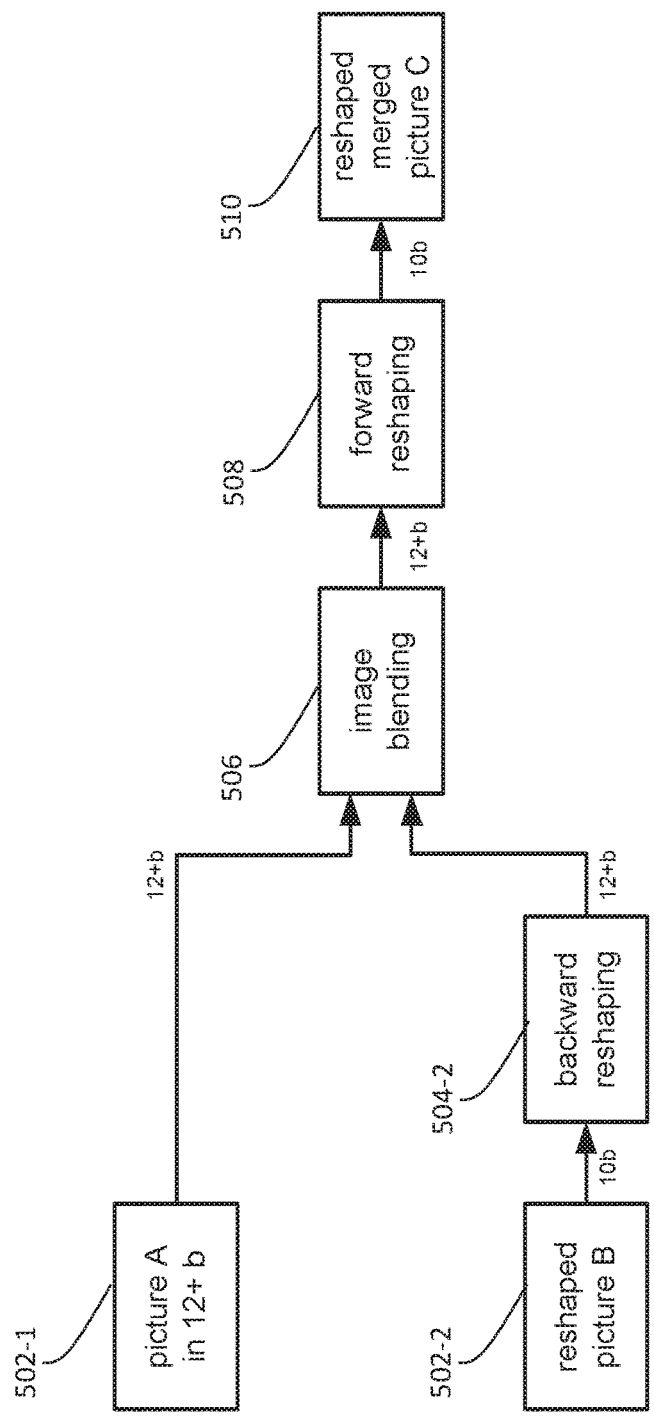
FIG. 5A and FIG. 5B illustrate example graphics blending.

FIG. 5A illustrates an example pipeline for performing graphics blending under other approaches. In an example, input images to be graphically blended comprise a first pre-reshaped input image 502-1 (e.g., a 12+ bit pre-reshaped image, represented in a pre-reshaped domain, etc.), denoted as a pre-reshaped image A. The input images further comprise a second input image 502-2 (e.g., a 10 bit reshaped image, represented in a reshaped domain, etc.) generated by forward reshaping a second wide dynamic range image (denoted as a pre-reshaped image B) based on a forward reshaping function (denoted as $f$). The forward reshaping function $f$ may be derived content adaptively from the second wide dynamic range image (the pre-reshaped image B). For example, the forward reshaping function $f$ may be constructed based on noise measurements (e.g., represented in a noise mask as described herein, etc.) determined for the second wide dynamic range image (the pre-reshaped image B).

In some embodiments, a second backward reshaping operation 504-2 is performed on the second input image (502-2) to convert the second input image (502-2) into a second backward reshaped image (e.g., a higher bit depth image, a 12+ bit image, represented in a pre-reshaped domain, etc.). The second backward reshaping operation (504-2) may be based on a backward reshaping function $f^{-1}$ that is related to the forward reshaping function $f$.

In some embodiments, a graphics blending operation 506 is performed to graphically blend the first pre-reshaped input image (502-1) and the second backward reshaped image (e.g., a 12+ bit image, etc.) into an intermediate blended image (e.g., a higher bit depth image, a 12+ bit image, etc.). The intermediate blended image may be represented in a pre-reshaped domain in which the first pre-reshaped input image (502-1) and the second backward reshaped image are also represented.

The intermediate blended image as generated in the processing pipeline of FIG. 5A can be formally expressed in the original pre-reshaped domain (e.g., 12+ bit domain, etc.) as follows:

$$\alpha f^{-1}(f(B))+(1-\alpha)A \quad (42)$$

where α is a blending coefficient which determines the proportion with which the first pre-reshaped input image (e.g., 502-1, image A) and the backward reshaped image derived from backward reshaping the second input image (502-2) based on the backward reshaping function $f^{-1}$ are blended together.

In some embodiments, a forward reshaping operation 508 is performed on the intermediate blended image (e.g., a higher bit depth image, a 12+ bit image, represented in the pre-reshaped domain, etc.) to generate a reshaped blended image 510 in the reshaped domain. The forward reshaping operation (508) may be based on a forward reshaping function (denoted as g) specifically determined/constructed for the intermediate blended image. To determine/construct the forward reshaping function g, new noise measurements may be measured and determined by convolving Gaussian filters (e.g., $G(r_L, \sigma_L^2)$, $G(r_H, \sigma_H^2)$) as described herein with image content of the intermediate blended image. The forward reshaping function g may then be generated based on the new noise measurements determined for the intermediate blended image based on codeword allocation techniques as described herein.

In some embodiments, the forward reshaping function g can be approximated as the forward reshaping function $f$ as follows:

$$g \approx f \quad (43)$$

Further, $f$ may be assumed to be approximately linear in a local area around each point x, as follows:

$$f(x) \approx bx \quad (44)$$

Thus, the reshaped blended image (510) of FIG. 5A can be formally expressed in the reshaped domain as follows:

$$g(\alpha f^{-1}(f(B))+(1-\alpha)A) \approx b\alpha B+b(1-\alpha)A \quad (45)$$

In short, in the processing pipeline of FIG. 5A, a backward reshaping operation is first performed on the second input image (502-2), which may be a 10 bit reshaped picture B, to generate the second backward reshaped image, which may be a 12+ bit frame. The second backward reshaped image is then graphically blended with the first pre-reshaped image (502-1), which may be a 12+ bit picture A, in a pre-reshaped domain such as an original pre-reshaped IPT-PQ 12+ bit domain, etc. Subsequently, forward reshaping (e.g., 508, etc.) is applied to the intermediate blended image in the pre-reshaped domain to generate the reshaped blended image (510) in the reshaped domain.

Figure 5B:
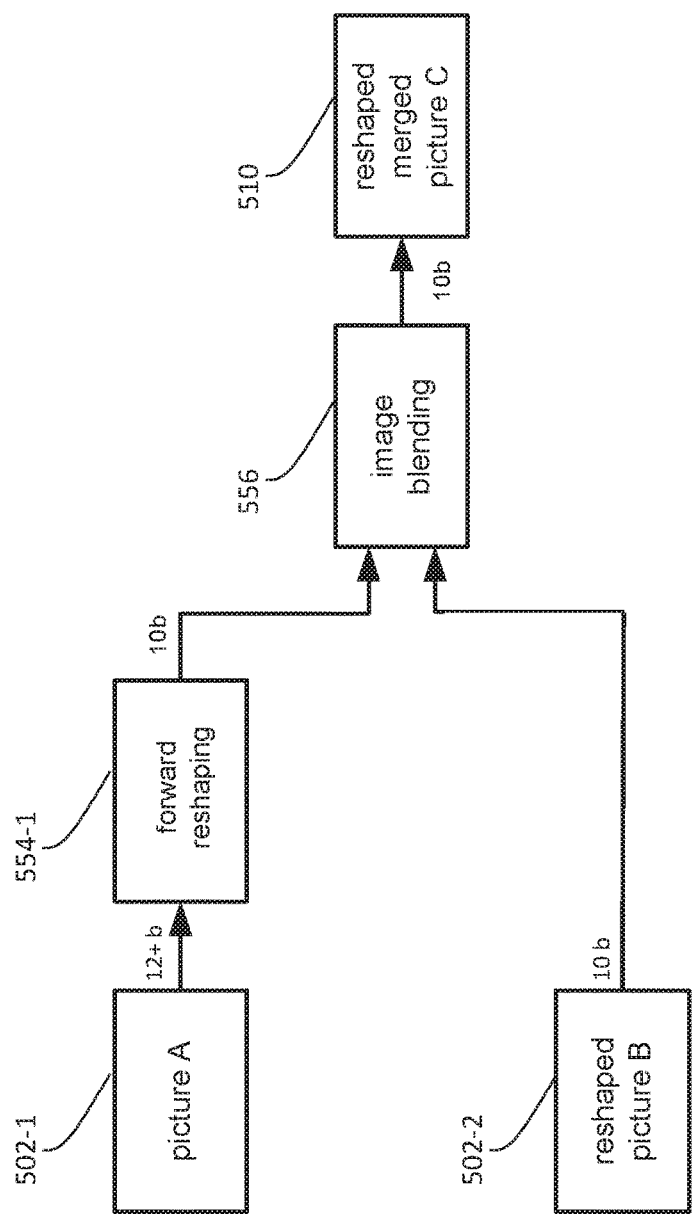

FIG. 5B illustrates an example improved pipeline for performing graphics blending. This improved pipeline can be used to provide efficient graphics blending. In some embodiments, graphics blending operations can be performed without actually generating an intermediate blended image (e.g., a higher bit depth image, a 12+ bit image, represented in a pre-reshaped domain, etc.) and without convolving Gaussian filters (e.g., $G(r_L, \sigma_L^2)$, $G(r_H, \sigma_H^2)$) with the intermediate blended image.

In an example, input images to be blended in FIG. 5B comprise the first input image (502-1) or the pre-reshaped image A of FIG. 5A. The input images of FIG. 5B further comprise the second input image (502-2) or the reshaped image B of FIG. 5A generated by forward reshaping a wide dynamic range image, for example the pre-reshaped image B, based on the forward reshaping function $f$ as previously mentioned.

In some embodiments, a first forward reshaping operation 554-1 is performed on the first input image (502-1) to convert the first input image (502-1) into a first forward reshaped image (e.g., a 10 bit image, etc.). The first forward reshaping operation (554-1) may be based on the same forward reshaping function fused to generate the second input image (502-2) of FIG. 5A.

In some embodiments, a graphics blending operation 556 is performed to merge the first forward reshaped image (e.g., a 10 bit image, etc.) and the second input image (502-2) into a reshaped blended image (e.g., 510).

In the processing pipeline of FIG. 5B, the same forward reshaping function $f$ is applied to the first pre-reshaped input image (e.g., 502-1, image A) and the second wide dynamic range image (or the pre-reshaped image B) to generate the images in the reshaped domain for blending. The reshaped blended image (510), or image C, can be written as:

$$\beta f(B)+(1-\beta)f(A) \approx \beta b B+(1-\beta)bA \quad (46)$$

where β is a blending coefficient for blending operations performed in the reshaped domain. In order for the two processing pipelines of FIG. 5A and FIG. 5B to be equivalent in terms of the final reshaped blended image (510) or the right hand sides (RHSs) of expressions (45) and (46) above, an equality may be established or set as follows:

$$b\alpha B+b(1-\alpha)A \approx \beta b B+(1-\beta)bA \quad (47)$$

Thus, by choosing β=α, approximately similar outputs can be obtained for the two processing pipelines of FIG. 5A and FIG. 5B for graphics blending (or image blending).

Comparative studies conducted for blending images using the two processing pipelines of FIG. 5A and FIG. 5B demonstrate no or little difference between blended images. Bright areas may be slightly better preserved in the processing pipeline of FIG. 5A, as input reshaped images in the reshaped domain in the processing pipeline of FIG. 5B may have a relatively large number of pixels in dark areas and a forward reshaping function may set soft high clipping in bright areas. Thus, graphics blending in the reshaped domain as shown in FIG. 5B may generate small or no information loss depending on whether original image content in the pre-shaped domain comprises bright areas that may be soft clipped by forward reshaping or not. However, in general, there is no or little difference between a blended image generated by the processing pipeline of FIG. 5B and a blended image generated by the processing pipeline of FIG. 5B for the same original image content.

Transcoding

Figure 6A:
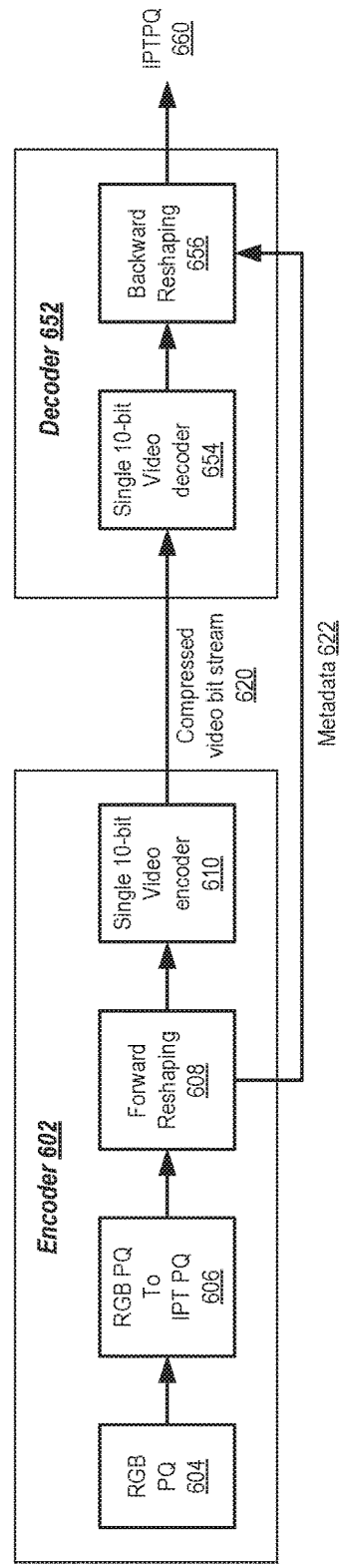
FIG. 6A through FIG. 6C illustrate example video encoder and decoder systems.

FIG. 6A illustrates an example video encoder system 602 that generates a CAQ video signal and an example video decoder system 652 that processes the CAQ video signal.

In some embodiments, the video encoder system (602) comprises a color space converter such as a RGB-PQ-to-IPT-PQ converter 606, a forward reshaping operator 608, a video encoder device such as a single 10-bit video encoder 610, etc. The components in the video encoder system (602) may be implemented by one or more computing processors individually and/or in combination. Each of the components in the video encoder system (602) may be implemented in software, hardware, or a combination of hardware and software.

For the purpose of illustration only, original video content comprises RGB PQ images (e.g., 604) encoded in an input 12+ bit video signal. The RGB-PQ-to-IPT-PQ converter (606) converts the RGB PQ images decoded from the input 12+ bit video signal into 12+ bit IPT PQ images. The forward reshaping operator (608) further forward reshapes (or compresses) the 12+ bit IPT PQ images into 10 bit reshaped IPT PQ images based on forward reshaping functions constructed/determined based on noise measurements made (e.g., with convolving noise measuring Gaussian filters, etc.) on the 12+ bit IPT images. The single 10-bit video encoder (610) encodes the 10 bit reshaped IPT PQ images into a compressed video bit stream 620. Backward reshaping functions that are related to the forward reshaping functions may be generated (e.g., using a histogram based method, using an error minimization method, etc.). Image metadata 622 defining the backward reshaping functions is encoded into and transmitted as a part of the compressed video bit stream (620).

In some embodiments, the video decoder system (652) comprises a single 10-bit video decoder 652, a backward reshaping operator 654, etc. The components in the video decoder system (652) may be implemented by one or more computing processors individually and/or in combination. Each of the components in the video decoder system (652) may be implemented in software, hardware, or a combination of hardware and software.

The single 10-bit video decoder (654) decodes the 10 bit reshaped IPT PQ images from a received compressed video bit stream (e.g., 620 as generated by the video encoder system (602). Backward reshaping functions that are related to the forward reshaping functions may be reconstructed from image metadata (622) defining the backward reshaping functions that is decoded from the compressed video bit stream (620). The backward reshaping operator (656) backward reshapes (or decompresses) 10 bit reshaped IPT PQ images into backward reshaped 12+ bit IPT PQ images 660 based on the backward reshaping functions reconstructed from the received image metadata.

Transcoding is used in many video applications. For example, a service provider may need to provide different bitstreams at different bit rates for the purpose of adapting transmission of a video program to time-varying bandwidths in an underlying network transport. The service provider could start from a mezzanine package (e.g., a compressed version adapted from an uncompressed master version, etc.) of the video program and use the mezzanine package to generate different bitstreams to be transmitted at different bit rates.

Transcoding from a mezzanine package to a targeted transmission package can be time consuming. By definition, transcoding operations that compress a larger bitrate package to a smaller bitrate package improve coding efficiency while reduce noise levels in the smaller bitrate package as compared with those in the larger bitrate package.

In some embodiments, a multi-stage transcoding process may be used to transcode an input transmission package such as a mezzanine package, etc., to output transmission packages such as targeted transmission packages for end-user devices and/or display applications, etc. More specifically, the input transmission package can be first transcoded by one or more first-stage transcoding systems into an intermediate bitstream that can be distributed from the first-stage transcoding systems to one or more second-stage transcoding systems with an intermediate bit rate much lower than what is needed to stream the input transmission package but still higher than target bit rates supported by some and even most of end-user devices and/or display applications. The intermediate bitstream can be transmitted from the first-stage transcoding systems to the second-stage transcoding systems (which can be much more numerous than the first-stage transcoding systems) at the intermediate bit rate. The intermediate bitstream can be transcoded by the second-stage transcoding systems (e.g., independent from one another, collaboratively, etc.) into target transmission packages that can be transmitted (e.g., streamed in real time or in near real time, etc.) to a wide variety of targeted bit rates dynamically supported by many or all of end-user devices and/or display applications.

In some embodiments, the first-stage transcoding systems can be configured to receive mezzanine packages of various media programs by real-time streaming at a very high bit rate (e.g., 200 Mbps or more, etc.) or by retrieving very large files containing the mezzanine packages in non-real time. The first-stage transcoding systems can be further configured with relatively large computation power and rich functionality to complete transcoding operations that may be relatively time consuming, repetitive, etc.

In some embodiments, the intermediate bitstream may be dynamically generated while being transmitted in real time from the first-stage transcoding systems to the second-stage transcoding systems. In some embodiments, the intermediate bitstream may be pre-generated, stored and transmitted/delivered in non-real time from the first-stage transcoding systems to the second-stage transcoding systems.

In some embodiments, the second-stage transcoding systems can be configured to receive the intermediate bitstream by real-time streaming at an intermediate bit rate (e.g., 5-25 times lower than that of the streaming rates of the mezzanine packages, etc.) or by retrieving intermediate size files containing the intermediate bitstream in non-real time. The second-stage transcoding systems can be further configured with computation power and functionality to complete targeted transcoding operations that may be relatively less time consuming, relatively specific to end-user devices and/or display applications, etc. In some embodiments, a targeted transmission package may comprise video segments (e.g., 3-second video chunk, 5-second video chunk, etc.), video chunks (e.g., 3-second video chunk, etc.), etc., that can be pre-generated and stored, and can be dynamically switched for transmitting an end-user device and/or display application based on network conditions experienced by the end-user device and/or display application (e.g., which may be signaled by the end-user device and/or display application back to a streaming server, etc.).

Figure 6B:
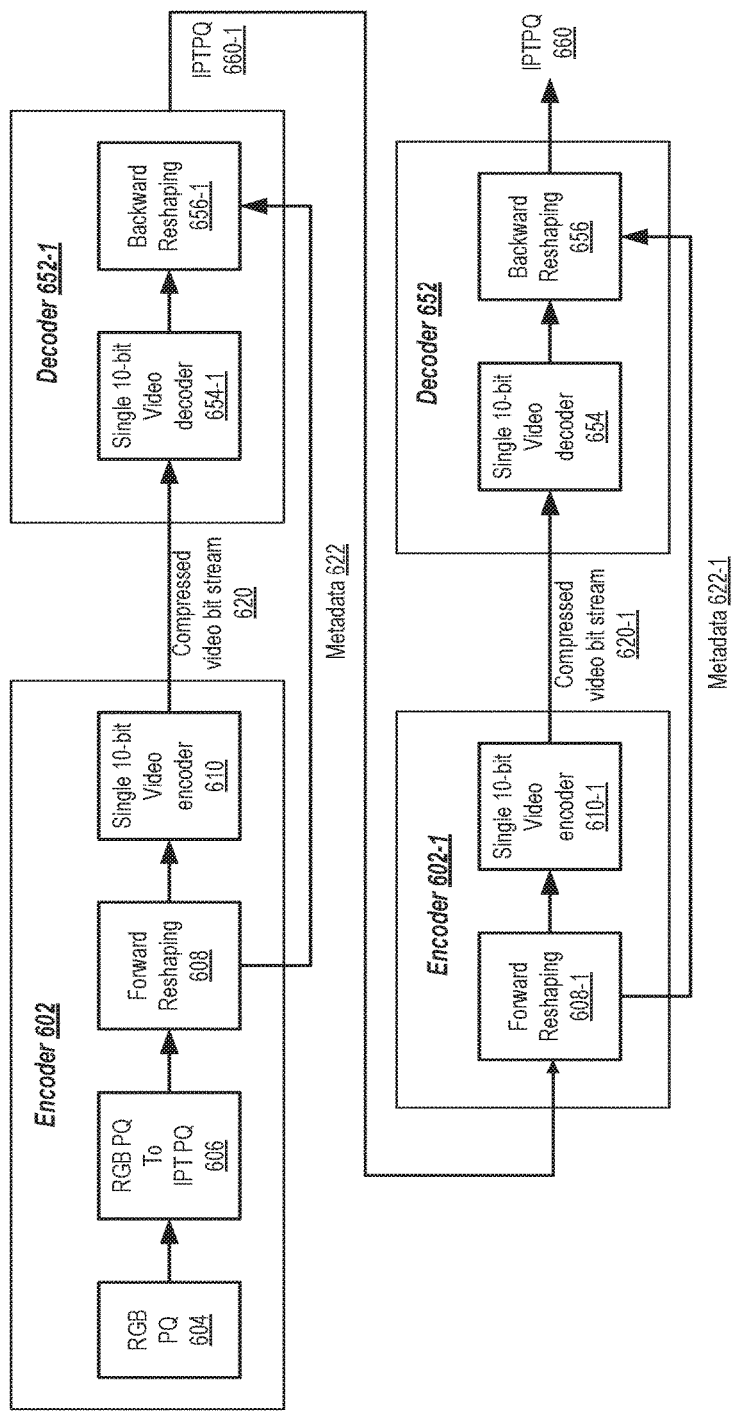

FIG. 6B illustrates an example pipeline for performing transcoding under other approaches. A transcoding system may comprise a video decoder system 652-1 and a video encoder system such as a video encoder system 602-1.

In some embodiments, the video decoder system (652-1) comprises a single 10-bit video decoder 654-1, a backward reshaping operator 656-1, etc., implemented by one or more computing processors individually and/or in combination. Each of the components in the video decoder system (652-1) may be implemented in software, hardware, or a combination of hardware and software.

The single 10-bit video decoder (654-1) decodes the 10 bit reshaped IPT PQ images from a received compressed video bit stream (e.g., 620 as generated by the video encoder system (602). Backward reshaping functions that are related to the forward reshaping functions may be reconstructed from image metadata (622) defining the backward reshaping functions that is decoded from the compressed video bit stream (620). The backward reshaping operator (656-1) backward reshapes (or decompresses) 10 bit reshaped IPT PQ images into backward reshaped 12+ bit IPT PQ images 660-1 based on the backward reshaping functions reconstructed from the received image metadata.

The backward reshaped 12+ bit IPT PQ images (660-1), as generated by the video decoder system (652-1), may be received and processed by the video encoder system (602-1). The backward reshaped 12+ bit IPT PQ images (660-1), as received by the video encoder system (602-1), may have been decoded and backward reshaped by the video decoder system (652-1) into a pre-reshaped domain such as the IPT PQ domain with a full 12+ bit depth.

By the definition of content adaptive PQ reshaping, a forward reshaping function (e.g., a forward reshaping curve, a forward reshaping LUT, etc.) is designed to fit signal characteristics such as noise measurements from a pre-reshaped image to which the forward reshaping function is applied. Thus, the forward reshaping operator (608-1) may perform noise measurements of the pre-reshaped image based on noise measuring Gaussian filters and perform codeword allocation operations to generate the forward reshaping function for the pre-reshaped image (e.g., each of the backward reshaped 12+ bit IPT PQ images (660-1), etc.).

In addition, a backward reshaping function that is related to the forward reshaping function can be determined by minimizing errors of the pre-reshaped image and a backward reshaped image generated by applying the backward reshaping function to a forward reshaped image generated by applying the forward reshaping function to the pre-reshaped image.

The forward reshaping operator (608-1) forward reshapes (or compresses) the backward reshaped 12+ bit IPT PQ images (660-1) into transcoded 10 bit reshaped IPT PQ images based on forward reshaping functions constructed/determined based on noise measurements made (e.g., with convolving noise measuring Gaussian filters, etc.) on the backward reshaped 12+ bit IPT PQ images (660-1). A single 10-bit video encoder (610-1) may be used to encode the transcoded 10 bit reshaped IPT PQ images into a compressed video bit stream 620-1. As noted, new backward reshaping functions may be generated (e.g., using a histogram based method, using an error minimization method, etc.) by the forward reshaping operator (608-1). Image metadata 622-1 defining the new backward reshaping functions can be encoded into and transmitted/delivered as a part of the compressed video bit stream (620-1), for example, to a video decoder system (e.g., 652, etc.).

In some embodiments, the processing pipeline of FIG. 6B for transcoding comprises additional transcoding stages. Transcoding operations similar to those performed by the transcoding system (the combination of the video decoder system 652 and the video encoder system 602-1) may be performed by transcoding systems implementing these additional transcoding stages. Generally speaking, transcoding can be done a single time or multiple times depending on the application.

Figure 6C:
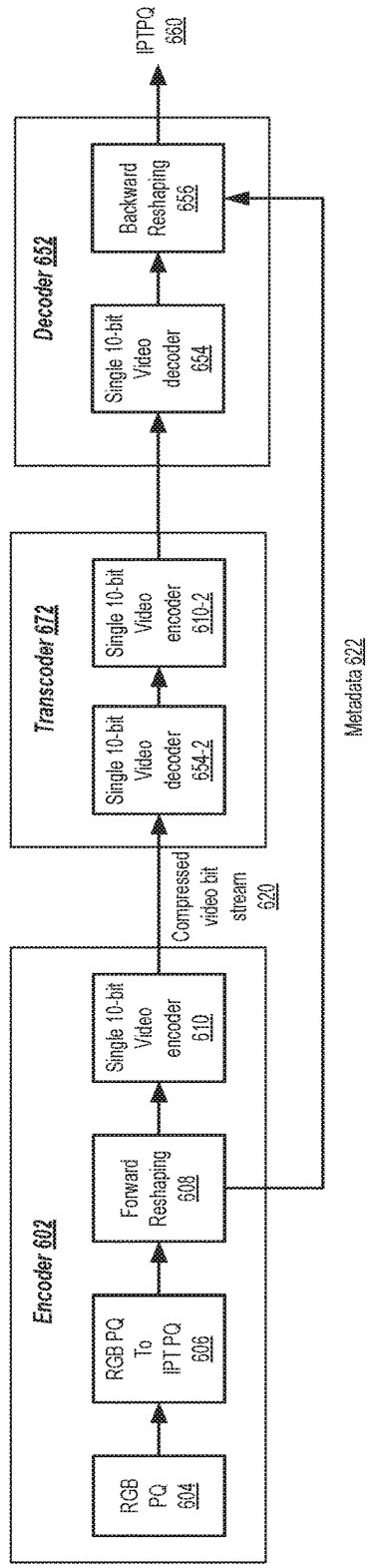

FIG. 6C illustrates an example improved pipeline for transcoding. This improved pipeline can be used to provide efficient transcoding. In some embodiments, transcoding operations can be performed entirely in the reshaped domain without actually generating intermediate backward reshaped 12+ bit images (e.g., 660, etc.), without convolving Gaussian filters (e.g., $G(r_L, \Gamma_L^2)$, $G(r_H, \sigma_H^2)$) with the backward reshaped 12+ bit images (660) to obtain noise measurements, without constructing new/intermediate forward reshaping functions based on the noise measurements, etc. A video transcoder system 672 in the improved pipeline may comprises a single 10-bit video decoder 654-2, a single 10-bit video encoder 610-2, etc. The components in the video transcoder system (672) may be implemented by one or more computing processors individually and/or in combination. Each of the components in the video transcoder system (672) may be implemented in software, hardware, or a combination of hardware and software.

The single 10-bit video decoder (654-2) decodes the 10 bit reshaped IPT PQ images from a received compressed video bit stream (e.g., 620 as generated by the video encoder system (602). In some embodiments, the video transcoder system (672) performs its operations entirely in the reshaped domain, and does not perform backward reshaping. Thus, backward functions that are related to the forward reshaping functions may not be reconstructed from image metadata (622) defining the backward reshaping functions.

As no backward reshaping is performed by the video transcoder system (672), no backward reshaped images are generated. Thus, no noise measurements on any backward reshaped images and no codeword allocation operations for generating forward reshaping functions need to be performed by the video transcoder system (672), as generating such backward reshaped images is avoided by the video transcoder (672).

In addition, backward reshaping functions need not be computed or determined by the video transcoder system (672). Thus, as there is no need for generating the backward reshaping functions, there is also no need for minimizing errors of pre-reshaped images and the backward reshaped images.

As a result, forward reshaping and backward reshaping are avoided (e.g., entirely, substantially, etc.) by the video transcoder system (672). The single 10-bit video encoder (610-2) may be used to encode (e.g., directly, without any backward or forward reshaping, etc.) the decoded 10 bit reshaped IPT PQ images into a new compressed video bit stream, which may be of a lower bitrate than that of the compressed video bitstream (620). Image metadata 622 received from the video encoder system (602) can be encoded into and transmitted/delivered as a part of the new compressed video bit stream, for example, to a video decoder system (e.g., 652, etc.).

If the processing pipeline of FIG. 6C for transcoding comprises additional transcoding stages, transcoding operations similar to those performed by the transcoding system (672) may be performed by transcoding systems implementing these additional transcoding stages. Generally speaking, transcoding can be performed once only or multiple times depending on specific applications.

Scaling—Chroma Formatting

FIG. 7A and FIG. 7B illustrate example chroma reformatting and backward chroma reshaping operations (e.g., backward chroma reshaping followed by chroma reformatting, chroma reformatting followed by backward chroma reshaping, etc.). In FIG. 7A, a backward chroma reshaping operation is performed before a chroma reformatting operation. For example, an input reshaped 10 bit IPT PQ 420 video signal may be first backward reshaped by the backward chroma reshaping operation into a backward reshaped 12+ bit IPT PQ 420 video signal. Subsequently, the backward reshaped 12+ bit IPT PQ 420 video signal is reformatted by the chroma reformatting operation into a first 12+ bit IPT PQ 444 video signal.

In FIG. 7B, the backward chroma reshaping operation is performed after the chroma reformatting operation. For example, the input reshaped 10 bit IPT PQ 420 video signal may be first reformatted by the chroma reformatting operation into a reformatted reshaped 10 bit IPT PQ 444 video signal. Subsequently, the reformatted reshaped 10 bit IPT PQ 444 video signal is backward reshaped by the backward chroma reshaping operation into a second 12+ bit IPT PQ 444 video signal.

Studies of these two different operational orders indicate little or no visually noticeable differences between the output signals (e.g., the first and second 12+ bit IPT PQ 444 video signals). This is so because chroma reshaping and chroma reformatting (or chroma resampling) are performed based on linear functions/relationships. As a result, these operations are transitive and can be exchanged in order.

Spatial Resampling for Luma Channel

When a given image (or frame) undergoes spatial resampling such as upsampling, etc., noise measurements (e.g., noise measurement histograms, noise measurement curves, etc.) will be different for the image before and after the spatial resampling, if noise measuring Gaussian filters use the same operational/functional parameters (e.g., bandwidth, standard deviation, etc.) for measuring noise (e.g., spatial frequencies, etc.) before and after the spatial resampling. This is so because the spatial resampling changes spatial scaling while a noise measurement method such as based on the Gaussian filters may not be scale invariant.

As the noise measurements before and after the upsampling have different results or values, forward reshaping functions before and after the upsampling, as generated by codeword allocation techniques based on these noise measurements, will also be different.

One possible solution is to change operational/functional parameters (e.g., bandwidth, standard deviation, etc.) of the Gaussian filters for measuring noise, in order to account for spatial scaling changes caused by spatial resampling. However, this solution depends on computing intensive noise measurements with different Gaussian filters (or Gaussian filters with different operational/functional parameters) for an individual spatial resampling operation. Furthermore, this solution generates complexity and inconsistency in noise measurements as different operational/functional parameters are used for different instances of noise measurements.

The inventors recognize that, since in a spatial resampling operation, samples (or pixel values in color space channels) from a pre-resampled image are used to deduce samples in desired positions in a resampled image, a relationship exists between noise measurements between the pre-resampled image and the resampled image.

Techniques as described herein can be used to determine such a relationship between noise measurements before and after a spatial resampling operation, where the noise measurements are made using the same noise measuring Gaussian filters (or Gaussian filters with the same operational/functional parameters). The relationship can then be used to deduce noise measurements (e.g. computed without actually measured with Gaussian filters, etc.) after the spatial resampling operation based on noise measurements (e.g., actually measured with Gaussian filters) before the spatial resampling operation; or conversely, noise measurements (e.g. computed without actually measured with Gaussian filters, etc.) before the spatial resampling operation based on noise measurements (e.g., actually measured with Gaussian filters) after the spatial resampling operation.

In some embodiments, a relationship between noise measurements before and after a spatial resampling operation is determined based on studies of specific images (e.g., images in a training set, representative images in different scenes, etc.) and spatial resampling operations with specific interpolation methods. The noise measurements can be actually made using the same noise measuring Gaussian filters (or Gaussian filters with the same operational/functional parameters). The relationship may be represented as a function (e.g., a matrix, a lookup table, etc.) of one or more input variables such as a type of an interpolation function (e.g., bilinear interpolation, bicubic interpolation, etc.) used to perform spatial resampling, a spatial scaling factor used in the interpolation function, content of an image such as spatial frequency characteristics of an image to which the interpolation function is applied, etc.

In some embodiments, for a given interpolation method F and a given input pre-sampled image I, a corresponding resampled image U can be derived as $$U=F(I) \quad (48)$$

Minimum noise measures $b_m$ for each codeword bin in image I and its corresponding resampled image U can be computed, for example, after these images are respectively convolved with noise measuring Gaussian filters.

In some embodiments, outlier codeword bins are removed from consideration based on the noise measurements. As used herein, an outlier codeword bin may refer to a codeword bin in which a minimum noise measurement is (1) greater than a first pre-specified factor (e.g., 2, 3, 10, etc.) times the median of the minimum noise measurements for all codeword bins or (2) smaller than a second pre-specified factor (e.g., 0.1, 0.01, etc.) times the median. One or both of the first pre-specified factor and the second pre-specified factor may be user or system configurable, may be preset based on empirical studies, etc.

After the outlier codeword bins are removed, the average minimum noise measurements of all the remaining codeword bins for the pre-resampled image and the resampled image is determined or calculated. A constant factor which describes or quantifies the relationship between the noise measurements for the pre-resampled image and the noise measurements for the resampled image for the interpolation method F and a scaling factor used in the interpolation method F can be obtained as follows.

$$c = \frac{\frac{1}{M}\sum_{l=0}^{M-1} b_{m,I}^{(l)}}{\frac{1}{M}\sum_{l=0}^{M-1} b_{m,U}^{(l)}} \quad (49)$$

where M is the number of the remaining codeword bins, and $b_{m,I}^{(l)}$ and $b_{m,U}^{(l)}$ are minimum noise measurements for the l-th codeword bin in the pre-resampled image I and the resampled image U, respectively.

Figure 8A:
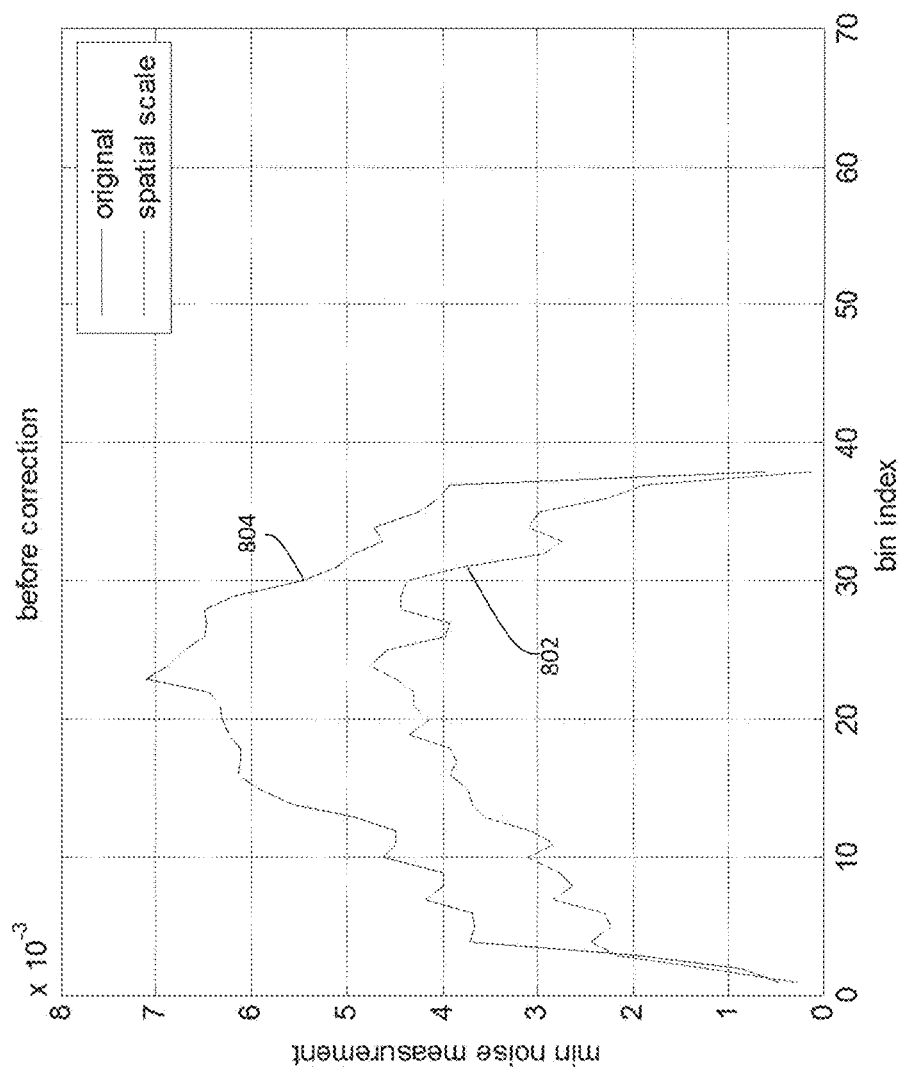
FIG. 8A and FIG. 8B illustrate example noise measurements actually made on, or deduced without actually measuring noises in, a resampled image.

FIG. 8A illustrates example noise measurements actually made on a pre-resampled image and a resampled image generated by applying a bicubic interpolation method with a scaling factor of 2 (a spatial upsampling operation). Noise measurements actually made on the pre-resampled image is represented in a first plot 802. Noise measurements actually made on the resampled image is represented in a second plot 804.

Figure 8B:
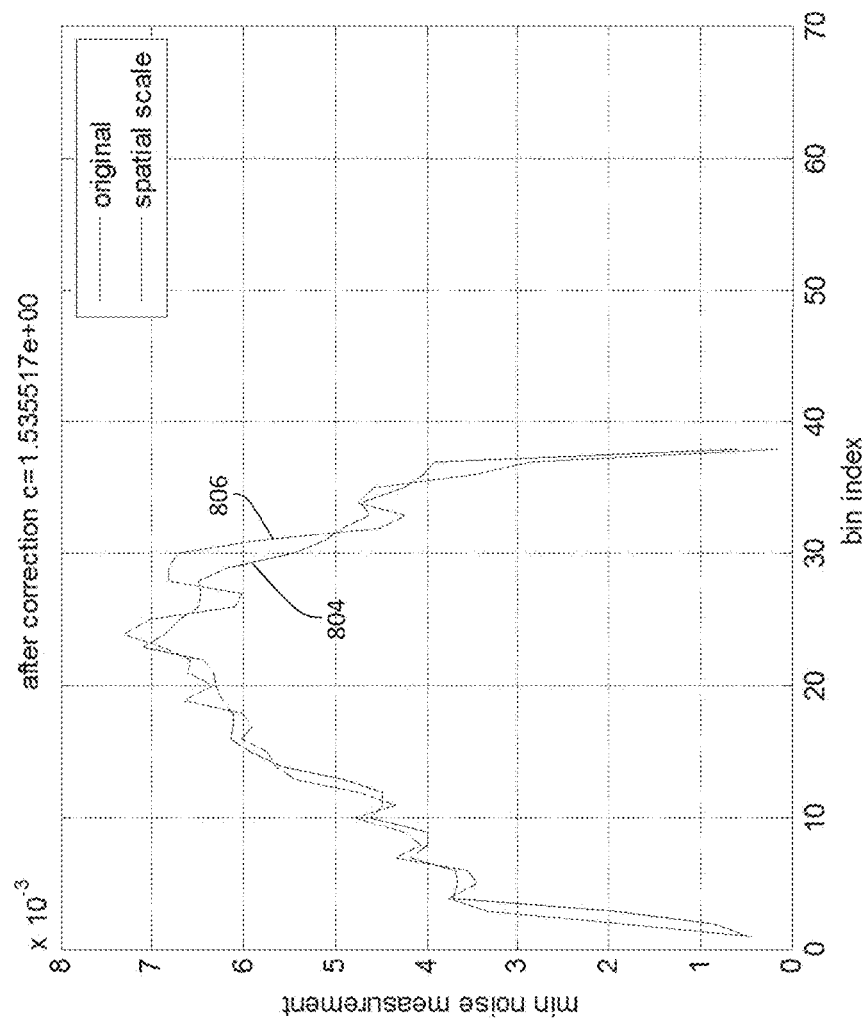

FIG. 8B illustrates example noise measurements not actually made but rather deduced from the pre-resampled image based on a constant factor (c=1.5) as determined in expression (49). The constant factor c=1.5 is applied to the noise measurements actually made on the pre-resampled image (802 of FIG. 8A) to generate deduced noise measurements for the resampled image, as represented in a third plot 806, without actually measuring noises with any noise measuring Gaussian filters.

Example Process Flows

Figure 9A:
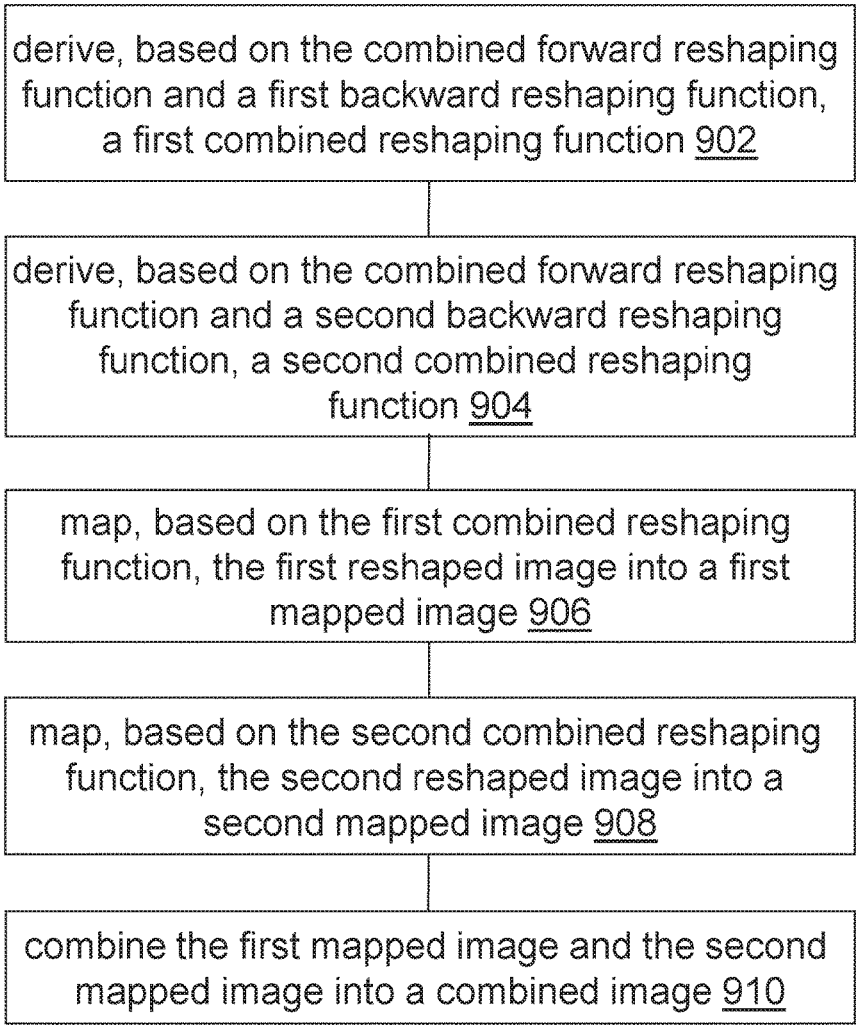

FIG. 9A illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 902, an image processing device derives, based on a forward reshaping function and a first backward reshaping function, a first combined reshaping function, the first backward reshaping function being related to a first forward reshaping function used for forward reshaping a first pre-reshaped image into a first reshaped image.

In block 904, the image processing device derives, based on the forward reshaping function and a second backward reshaping function, a second combined reshaping function, the second backward reshaping function being related to a second forward reshaping function used for forward reshaping a second pre-reshaped image into a second reshaped image.

In block 906, the image processing device maps, based on the first combined reshaping function, the first reshaped image into a first mapped image.

In block 908, the image processing device maps, based on the second combined reshaping function, the second reshaped image into a second mapped image.

In block 910, the image processing device combines the first mapped image and the second mapped image into a combined image.

In an embodiment, the first reshaped image and the first mapped image are represented in a common reshaped domain.

In an embodiment, the first reshaped image and the second reshaped image are represented in a common reshaped domain.

In an embodiment, the first forward reshaping function is the same as the second forward reshaping function.

In an embodiment, the first forward reshaping function is different from the second forward reshaping function.

In an embodiment, the first reshaped image comprises a first plurality of pixel values in a reshaped domain; the second reshaped image comprises a second plurality of pixel values in the reshaped domain; the first plurality of pixel values is different from the second plurality of pixel values. In an embodiment, each pixel value in the first plurality of pixel values comprises a set of component pixel values, and a component pixel value in the set of component pixel values relates to a color space channel.

In an embodiment, the first reshaped image is represented in a reshaped domain; the reshaped domain is of a bit depth of one of 8, 9, 10, 11+ bits, etc.

In an embodiment, the first pre-reshaped image is represented in a pre-reshaped domain; the pre-reshaped domain is of a bit depth of one of 12, 13, 14, 15+ bits, etc.

In an embodiment, the first forward reshaping function is constructed based on a plurality of minimum noise levels of the first pre-reshaped image in a plurality of codeword bins.

In an embodiment, the first backward reshaping function is based on minimizing errors between the first pre-reshaped image and a predicted image constructed from the first forward reshaped image.

In an embodiment, the combined image comprises a plurality of merged pixel values; the first mapped image comprises a plurality of first combined reshaped pixel values; the second mapped image comprises a plurality of second combined reshaped pixel values; a merged pixel value in the plurality of merged pixel values is one of (a) a corresponding first combined reshaped pixel value in the plurality of first combined reshaped pixel values in the first mapped image or (b) a corresponding second combined reshaped pixel value in the plurality of second combined reshaped pixel values in the second mapped image.

In an embodiment, the image processing device is further configured to generate the forward reshaping function based on the first forward reshaping function and the second forward reshaping function.

In an embodiment, the combined image comprises a plurality of blended pixel values; the first mapped image comprises a plurality of first combined reshaped pixel values; the second mapped image comprises a plurality of second combined reshaped pixel values; a blended pixel value in the plurality of blended pixel values is blended based on a blending factor from (a) a corresponding first combined reshaped pixel value in the plurality of first combined reshaped pixel values in the first mapped image or (b) a corresponding second combined reshaped pixel value in the plurality of second combined reshaped pixel values in the second mapped image.

FIG. 9B illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 922, an image processing device calculates a plurality of slopes of a dynamic range non-linear scaling (DRNLS) function at a plurality of pre-scaled codeword locations. The DRNLS function is used for non-linearly scaling a pre-scaled image to a scaled image. The pre-scaled image relates to a plurality of pre-scaled noise levels in a plurality of pre-scaled codeword bins. Each pre-scaled codeword location in the plurality of pre-scaled codeword locations is located in a respective pre-scaled codeword bin in the plurality of pre-scaled codeword bins.

In blocks 922 and 924, the image processing device maps, based on the DRNLS function, individual pre-scaled codeword locations in the plurality of pre-scaled codeword locations into a plurality of scaled codeword locations.

In block 926, the image processing device determines, based on the plurality of pre-scaled noise levels and the plurality of slopes of the DRNLS function, a plurality of deduced noise levels in a plurality of scaled codeword bins for the scaled image.

In an embodiment, the plurality of pre-scaled codeword locations corresponds to a plurality of pre-scaled codeword bins in a pre-scaled domain in which the pre-scaled image is represented.

In an embodiment, the plurality of scaled codeword locations corresponds to a plurality of scaled codeword bins in a scaled domain in which the scaled image is represented; one or more pre-scaled codeword bins in the plurality of pre-scaled codeword bins are mapped to a single scaled codeword bin in the plurality of scaled codeword bins; the image processing device is further configured to use the minimum of minimum noise levels in the one or more pre-scaled codeword bins to determine a deduced noise level in the single scaled codeword bin.

In an embodiment, the plurality of scaled codeword locations corresponds to a plurality of scaled codeword bins in a scaled domain in which the scaled image is represented; no pre-scaled codeword bin in the plurality of pre-scaled codeword bins is mapped to a specific scaled codeword bin in the plurality of scaled codeword bins; the image processing device is further configured to interpolate from deduced noise levels in one or more neighboring scaled codeword bins to fill in a deduced noise level in the specific scaled codeword bin.

In an embodiment, the image processing device is further configured to cause one or more image transform operations to be performed based at least in part on the plurality of deduced noise levels in the scaled image.

Figure 9C:
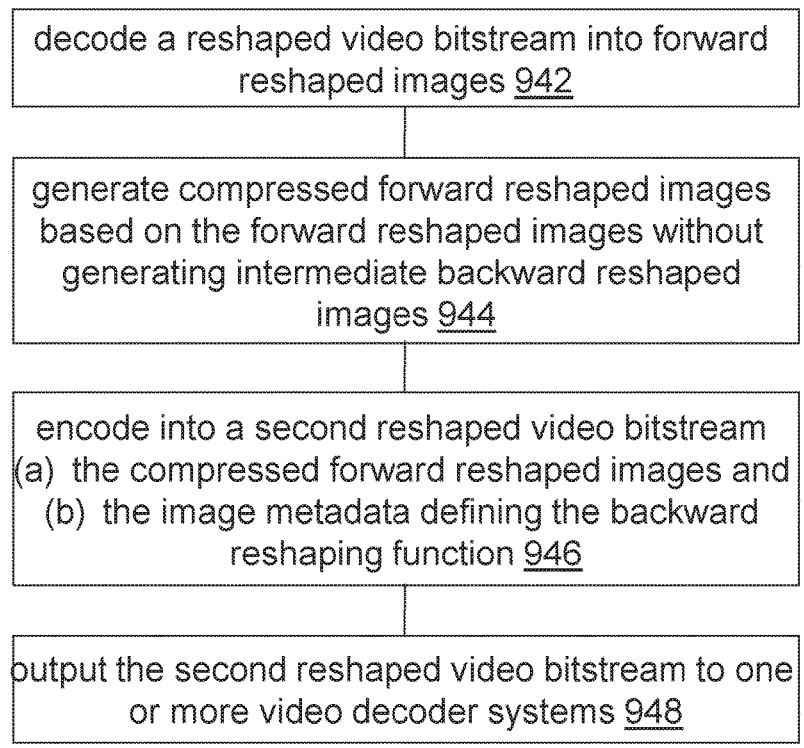

FIG. 9C illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 942, a video transcoder system decodes a reshaped video bitstream generated by a video encoder system into one or more forward reshaped images, the one or more forward reshaped images having been generated by the video encoder system from one or more wide dynamic range images of an initial transmission package based on a forward reshaping function, the reshaped video bitstream being encoded with image metadata defining a backward reshaping function that is related to the forward reshaping function.

In block 944, the video transcoder system generates one or more compressed forward reshaped images based on the one or more forward reshaped images without generating intermediate backward reshaped images by backward reshaping the one or more forward reshaped images based on the backward reshaping function.

In block 946, the video transcoder system encodes into a second reshaped video bitstream (a) the one or more compressed forward reshaped images and (b) the image metadata defining the backward reshaping function.

In block 948, the video transcoder system outputs the second reshaped video bitstream to one or more video decoder systems.

In an embodiment, the video transcoder system is further configured to perform one or more image transform operations on the one or more forward reshaped images before compressing the one or more forward reshaped images as processed into the one or more compressed forward reshaped images.

In an embodiment, each of the one or more image transform operations on the one or more forward reshaped images is performed in a reshaped domain in which the one or more forward reshaped images as decoded from the first reshaped video bitstream, the one or more forward reshaped images as processed by the one or more image transform operations, and the one or more compressed forward reshaped images are represented.

Figure 9D:
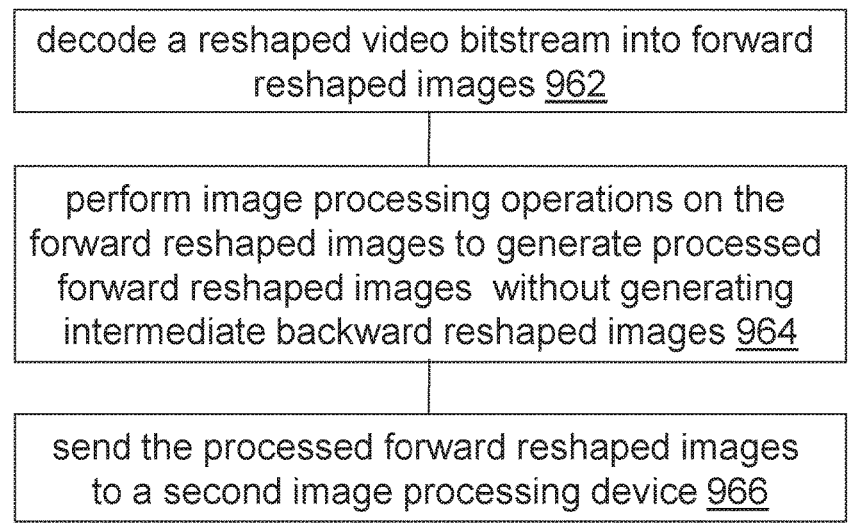

FIG. 9D illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 962, an image processing device receives one or more forward reshaped images generated by an image forward reshaping device, the one or more forward reshaped images being generated by the image forward reshaping device from one or more wide dynamic range images based on a forward reshaping function, the forward reshaping function relating to a backward reshaping function.

In block 964, the image processing device performs one or more image transform operations on the one or more forward reshaped images to generate one or more processed forward reshaped images without generating intermediate backward reshaped images by backward reshaping the one or more forward reshaped images or by backward reshaping one or more processed forward reshaped images based on the backward reshaping function.

In block 966, the image processing device sends the one or more processed forward reshaped images to a second image processing device.

In an embodiment, the image processing device is further configured to send the backward reshaping function along with the one or more processed forward reshaped images to the second image processing device.

In an embodiment, the image processing device is further configured to perform: deducing, by the image processing device, a new backward reshaping function based on the backward reshaping function and a relationship between the backward reshaping function and the new backward reshaping function, the relationship being determined based on at least one of the one or more image transform operations; sending the new backward reshaping function along with the one or more processed forward reshaped images to the second image processing device; etc.

In an embodiment, the relationship is determined based on tangent or slope values as determined from a dynamic range non-linear scaling (DRNLS) function.

In an embodiment, the relationship is determined based at least in part on one of a type of an interpolation method used in a spatial resampling operation or a scaling factor used in the interpolation method. In an embodiment, the spatial resampling operation is one of a downsampling operation or an upsampling operation.

In an embodiment, the one or more image transform operations comprise one or more of decoding operations, tone mapping operations, image merging operations, graphics blending operations, combined reshaping operations, transcoding operations, chroma reformatting operations, spatial resampling operations, lossless compression operations, lossy compression operations, encoding operations, etc.

Figure 9E:
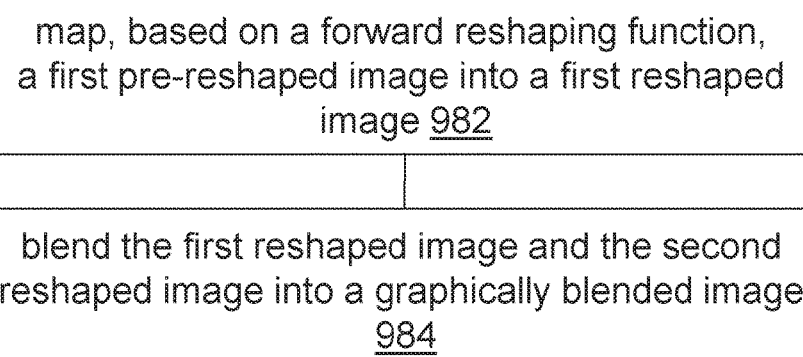

FIG. 9E illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 982, an image processing device maps, based on a forward reshaping function, a first pre-reshaped image into a first reshaped image. The forward reshaping function is used for forward reshaping a second pre-reshaped image into a second reshaped image.

In block 984, the image processing device blends the first reshaped image and the second reshaped image into a graphically blended image. The graphically blended image comprises a plurality of blended pixel values. The first reshaped image comprises a plurality of first reshaped pixel values. The second reshaped image comprises a plurality of second reshaped pixel values. A blended pixel value in the plurality of blended pixel values is blended based on a blending factor from (a) a corresponding first reshaped pixel value in the plurality of first reshaped pixel values in the first mapped image or (b) a corresponding second reshaped pixel value in the plurality of second reshaped pixel values in the second reshaped image.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
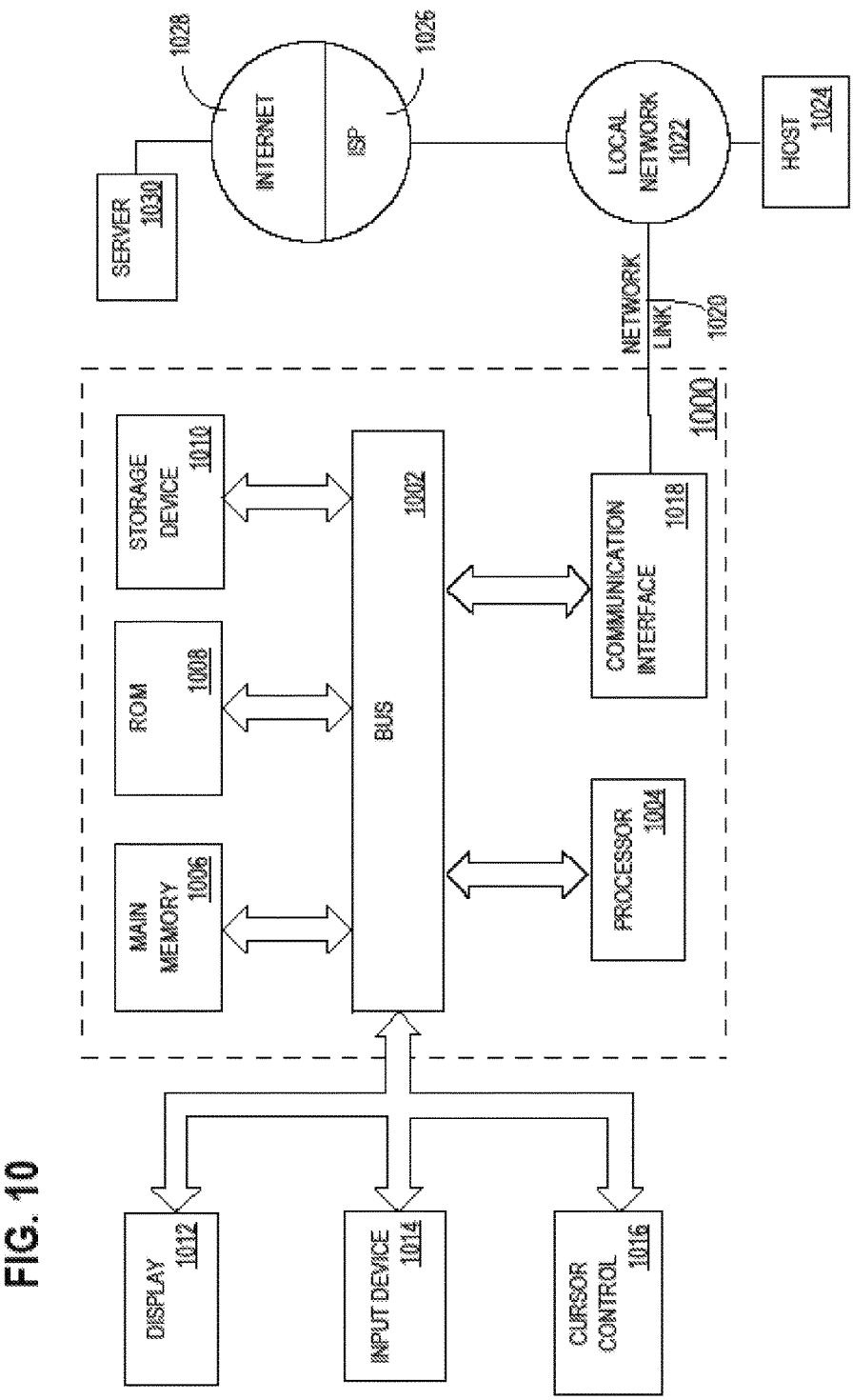
FIG. 10 illustrates a simplified block diagram of an example hardware platform on which a computer or a computing device as described herein may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a liquid crystal display, for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques as described herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Example embodiments that relate to the efficient adaptive perceptual quantization of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of merging images, comprising: by apparatus comprising one or more data processors configured by software, one or more programmable logic devices, one or more logic circuits or a combination thereof:

obtaining a first and a second forward reshaping function for re-quantizing a first and second pre-reshaped image into a first and second reshaped image respectively, wherein each forward reshaping function is obtained by:
generating a noise mask image comprising a masking noise estimate for each pixel in a corresponding pre-reshaped image;
generating a noise mask histogram comprising a number of bins, wherein for each bin, pixels in the first and the second pre-reshaped image are identified which have pixel values in a range associated with said bin, and a minimum pixel value of the noise mask image pixels corresponding to the identified pixels is selected as a bin value for said bin;
determining a minimal bit depth for each bin of the noise mask histogram based on the bin value of said bin; and
computing the first and the second forward reshaping function on the basis of the determined minimal bit depths;
obtaining a first and a second backward reshaping function for reversing operation of the first and the second forward reshaping function respectively;
generating a further forward reshaping function from noise measurements of the first and the second pre-reshaped image by:
generating a noise masking histogram comprising a number of bins, each bin value corresponding to a minimum of bin values of the number of bins of the noise mask histogram used for generating the first and the second forward reshaping function respectively;
computing an estimate of a minimum number of bits required for each bin of the noise mask histogram based on the value of said bin; and
computing the further forward reshaping function on a basis of the estimate of the minimum number of bits;
deriving, based on the further forward reshaping function and the first backward reshaping function, a first combined reshaping function;
deriving, based on the further forward reshaping function and the second backward reshaping function, a second combined reshaping function;
mapping, based on the first combined reshaping function, the first reshaped image into a first mapped image;
mapping, based on the second combined reshaping function, the second reshaped image into a second mapped image; and
combining the first mapped image and the second mapped image into a combined image, the combined image comprising a plurality of merged or blended pixel values, thereby reducing a computational intensity of obtaining the combined image.

2. The method of claim 1, wherein the first reshaped image and the first mapped image are represented in a common reshaped domain, and/or wherein the first reshaped image and the second reshaped image are represented in a common reshaped domain.

3. The method of claim 1, wherein the first forward reshaping function is the same as the second forward reshaping function, or wherein the first forward reshaping function is different from the second forward reshaping function.

4. The method of claim 1, wherein the first reshaped image comprises a first plurality of pixel values in a reshaped domain, wherein the second reshaped image comprises a second plurality of pixel values in the reshaped domain, and wherein the first plurality of pixel values are different from the second plurality of pixel values.

5. The method of claim 4, wherein each pixel value in the first plurality of pixel values comprises a set of component pixel values, and wherein a component pixel value in the set of component pixel values relates to a color space channel.

6. The method of claim 1, wherein the first reshaped image is represented in a reshaped domain of a bit depth of one of 8, 9, 10, or 11+bits, and/or wherein the first pre-reshaped image is represented in a pre-reshaped domain of a bit depth of one of 12, 13, 14, or 15+bits.

7. The method of claim 1, wherein the first backward reshaping function is based on minimizing errors between the first pre-reshaped image and a predicted image constructed from the first forward reshaped image.

8. The method of claim 1, wherein the combined image comprises a plurality of merged pixel values, wherein the first mapped image comprises a plurality of first combined reshaped pixel values, wherein the second mapped image comprises a plurality of second combined reshaped pixel values, and wherein a merged pixel value in the plurality of merged pixel values is one of (a) a corresponding first combined reshaped pixel value in the plurality of first combined reshaped pixel values in the first mapped image or (b) a corresponding second combined reshaped pixel value in the plurality of second combined reshaped pixel values in the second mapped image.

9. An apparatus comprising a processor and configured to perform the method recited in claim 1.

10. A non-transitory computer-readable storage medium having stored thereon computer-executable instructions for executing a method with one or more processors in accordance with claim 1.

* * * * *